(12) United States Patent
Yomo et al.

(10) Patent No.: US 10,578,713 B2
(45) Date of Patent: Mar. 3, 2020

(54) RADAR AXIS DISPLACEMENT AMOUNT CALCULATION DEVICE AND RADAR AXIS DISPLACEMENT CALCULATION METHOD

(71) Applicant: Panasonic Corporation, Osaka (JP)

(72) Inventors: Hidekuni Yomo, Kanagawa (JP); Akihiko Matsuoka, Kanagawa (JP)

(73) Assignee: Panasonic Corporation, Osaka (JP)

( * ) Notice: Subject to any disclaimer, the term of this patent is extended or adjusted under 35 U.S.C. 154(b) by 729 days.

(21) Appl. No.: 15/166,165

(22) Filed: May 26, 2016

(65) Prior Publication Data

US 2016/0377702 A1 Dec. 29, 2016

(30) Foreign Application Priority Data

Jun. 24, 2015 (JP) .................................. 2015-126741
Jan. 15, 2016 (JP) .................................. 2016-006079

(51) Int. Cl.
*G01S 7/40* (2006.01)
*G01S 13/93* (2006.01)
*G01S 13/931* (2020.01)

(52) U.S. Cl.
CPC .......... *G01S 7/4026* (2013.01); *G01S 13/931* (2013.01); *G01S 2007/403* (2013.01); *G01S 2007/4034* (2013.01); *G01S 2007/4086* (2013.01); *G01S 2013/9375* (2013.01); *G01S 2013/9389* (2013.01)

(58) Field of Classification Search
CPC ............. G01S 7/4026; G01S 2007/403; G01S 2007/4034; G01S 2007/4082; G01S 2007/4086; G01S 13/931; G01S 2013/9371; G01S 2013/9375; G01S 2013/9389; G01B 5/24; G01B 5/25; G01B 5/252; G01B 7/31; G01B 11/26; G01B 11/27; G01B 21/22; G01B 21/24; H01Q 19/00; H01Q 19/10; H01Q 19/106
See application file for complete search history.

(56) References Cited

U.S. PATENT DOCUMENTS

| 4,382,258 A * | 5/1983 | Tabourier .............. G01S 13/343 342/110 |
| 5,724,743 A * | 3/1998 | Jackson ............. G01B 11/2755 33/203.18 |
| 6,346,909 B1 * | 2/2002 | Johnson, Jr. .......... G01S 7/4052 342/167 |
| 7,424,387 B1 * | 9/2008 | Gill ...................... G01B 11/272 33/288 |

(Continued)

FOREIGN PATENT DOCUMENTS

| JP | 11-296227 | 10/1999 |
| JP | 2000-275355 | 10/2000 |

(Continued)

*Primary Examiner* — Vladimir Magloire
*Assistant Examiner* — Daniel P Malley, Sr.
(74) *Attorney, Agent, or Firm* — Seed IP Law Group LLP

(57) ABSTRACT

A processor generates first position information on a relative position between a camera and a radar, acquires, from the radar, second position information on a relative position between the radar and a reflector, the second position information being generated by using an arrival direction of the radar transmission wave, and calculates a displacement amount by comparing the first position information and the second position information with each other.

7 Claims, 18 Drawing Sheets

FIG. 5

(56) References Cited

U.S. PATENT DOCUMENTS

| | | | |
|---|---|---|---|
| 2004/0049930 A1* | 3/2004 | Murray | G01B 11/27 33/288 |
| 2005/0062615 A1* | 3/2005 | Braeuchle | B60K 31/0008 340/903 |
| 2005/0219530 A1* | 10/2005 | Horibe | G01S 7/4972 356/399 |
| 2006/0176214 A1* | 8/2006 | Nakagawa | G01S 7/4026 342/174 |
| 2008/0012752 A1* | 1/2008 | Okamura | G01S 7/4026 342/165 |
| 2012/0020518 A1* | 1/2012 | Taguchi | G06T 7/292 382/103 |
| 2013/0127655 A1 | 5/2013 | Kishigami et al. | |
| 2014/0222246 A1* | 8/2014 | Mohamadi | G01S 13/913 701/2 |
| 2016/0116573 A1* | 4/2016 | Appia | G01S 7/40 342/52 |

FOREIGN PATENT DOCUMENTS

| | | |
|---|---|---|
| JP | 2003-315441 | 11/2003 |
| JP | 2006-090826 | 4/2006 |
| JP | 2012-225688 | 11/2012 |

* cited by examiner

RADAR AXIS DISPLACEMENT AMOUNT CALCULATION DEVICE AND RADAR AXIS DISPLACEMENT CALCULATION METHOD

BACKGROUND

1. Technical Field

The present disclosure relates to a radar axis displacement amount calculation device capable of calculating a displacement amount between a radar axis that is a direction of a radar transmission wave transmitted by a radar provided on a vehicle, a construction machine or the like, and a reference direction that is a direction serving as a reference of the radar transmission wave transmitted by the radar, and a method of calculating a radar axis displacement amount.

2. Description of the Related Art

A technique of acquiring information such as relative position, relative speed and direction with respect to a target object using a radar as a sensor is used widely. For example, there is a technique of measuring a moving speed and direction of an object (such as an obstacle) around a vehicle, and a distance between the object and a vehicle by using a radar mounted on the vehicle. Also, for example, there is an attempt to obtain detailed three dimensional positions of each part of a construction machine such as a hydraulic shovel or a crane by using a radar attached to the part.

In order to use a radar as a sensor, the radar needs to be installed with high positioning accuracy. When the radar is installed on a movable part, in particular, the radar may be displaced from the proper installation position. For this reason, for example, whether the positioning accuracy is maintained at a tolerable level has to be checked at predetermined intervals. For example, Japanese Patent No. 3511605 discloses a technique of adjusting a radar axis of a radar.

Japanese Patent No. 3511605 discloses an axis adjustment device for an in-vehicle radar installed at the front of a vehicle, the device including: a laser pointer attached to the in-vehicle radar in an adjusted state where the axis of the laser pointer is aligned with the radar wave axis of the in-vehicle radar; a laser pointer reflector which is installed at a predetermined distance from the vehicle and arranged vertical to the widthwise center axis of the vehicle, and which is configured to reflect a light spot of light emitted from the laser pointer; a front view capturing camera (for example, an in-vehicle camera or an off-vehicle camera) which is installed with the axis thereof adjusted to the widthwise center axis, and is configured to capture an image including at least a pair of light emission sources (for example, corner markers or corner poles provided on the vehicle) installed at positions symmetrical with respect to the widthwise center axis; an image processor configured to calculate a laser adjustment target point necessary for the axis adjustment of the in-vehicle radar as a point to which the light spot is to be moved; and a monitor configured to display the laser adjustment target point and the light spot on the monitor screen.

However, the technique disclosed in Japanese Patent No. 3511605 aligns the radar axis with a direction parallel with the travel direction of the vehicle, and therefore is not applicable to axis adjustment of a radar installed with the radar axis thereof aligned with a direction not parallel with the travel direction of the vehicle. Also, the technique disclosed in Japanese Patent No. 3511605 is applied to a radar that measures distance and direction to the target in the horizontal direction, and therefore is not applicable to a radar (for example, a radar installed on a construction machine) that is required to achieve high accuracy in estimation of distance and direction in the vertical direction as well.

SUMMARY

One non-limiting and exemplary embodiment provides a radar axis displacement amount calculation device that achieves high installation flexibility of a radar and is capable of accurately calculating a displacement amount between a radar axis that is a direction of the radar transmission wave transmitted by the radar and a reference direction that is a direction serving as a reference of the radar transmission wave transmitted by the radar, and a method of calculating a radar axis displacement amount.

In one general aspect, the techniques disclosed here feature a radar axis displacement amount calculation device including: a reflector that reflects a radar transmission wave in an arrival direction of the radar transmission wave, the radar transmission wave being transmitted by a radar attached to a first object; a camera that generates a first image including a portion of the first object to which the radar is attached; and a processor that calculates a displacement amount between a radar axis being a direction of the radar transmission wave transmitted by the radar, and a reference direction being a direction serving as a reference of the radar transmission wave transmitted by the radar by using the first image and the arrival direction of the radar transmission wave. The camera has an optical axis aligned with a facing direction of the reflector, and the processor generates first position information on a relative position between the camera and the radar by using the first image; acquires, from the radar, second position information on a relative position between the radar and the reflector, the second position information being generated by using the arrival direction of the radar transmission wave; and calculates the displacement amount by comparing the first position information and the second position information with each other.

The radar axis displacement amount calculation device according to one aspect of the present disclosure provides a high installation flexibility of the radar and is capable of calculating a displacement amount between the radar axis and reference direction with high accuracy.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Figure 1:
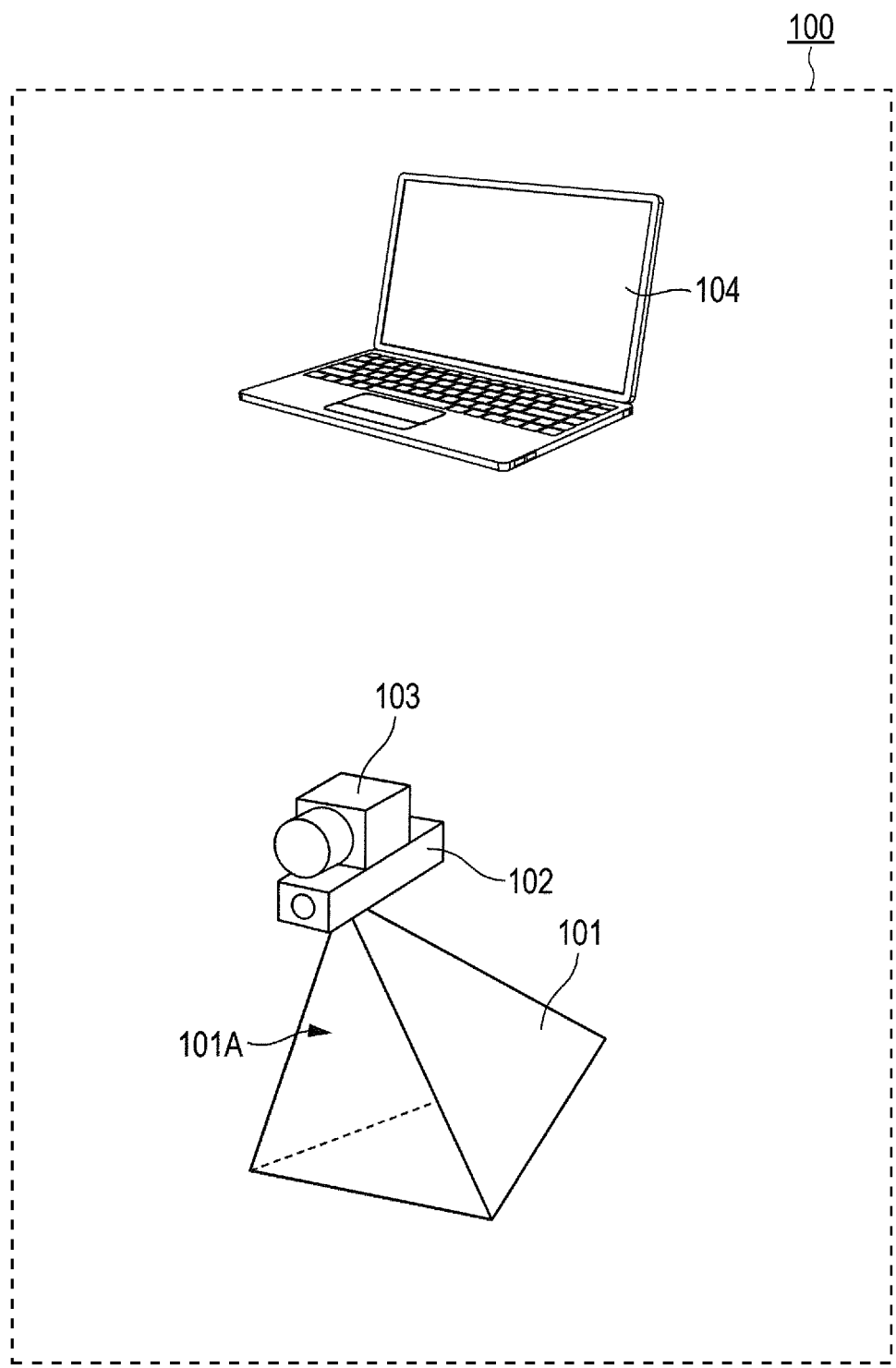
FIG. 1 illustrates a radar axis displacement amount calculation device according to an embodiment of the present disclosure.

Hereinafter, embodiments of the present disclosure are described with reference to the accompanying drawings. FIG. 1 illustrates a radar axis displacement amount calculation device 100 according to an embodiment of the present disclosure. The radar axis displacement amount calculation device 100 includes a reflector 101, a laser distance meter 102, a camera 103, and a processor 104.

The reflector 101 is formed by putting together multiple reflection members that reflects the radar transmission wave in a suitable manner and is configured to reflect the radar transmission wave in an arrival direction of the radar transmission wave. The reflector 101 is, for example, a corner reflector with an opening 101A formed by putting together two or three square or isosceles triangle metal sheets that are the reflection members so as to face each other at the right angle. The radar transmission wave incident from the opening 101A to the reflector 101 is reflected by the reflection member, and radar reflection wave returns from the opening 101A in the arrival direction (to the radar). The radar reflection wave is in parallel with the incident radar transmission wave and is directed in an opposite direction. A positional relation among the reflector 101, the laser distance meter 102 and the camera 103 described later is pre-adjusted such that a facing direction of the reflector 101, an optical axis of the laser distance meter 102, and an optical axis of the camera 103 are aligned with one another.

The laser distance meter (distance measuring unit) 102, for example, emits pulse laser light and receives a light reflected from a target object. The laser distance meter 102 calculates a distance to a target object based on the phase difference between emitted light and reflected light and generates distance information. In the embodiment, the laser distance meter 102 calculates a distance from the radar axis displacement amount calculation device 100 to the radar and generates distance information.

The camera 103 captures an object including the radar where the radar axis is to be adjusted, and generates an image (first image). As described above, a positional relation among the reflector 101, the laser distance meter 102 and the camera 103 is pre-adjusted such that the optical axis of the camera 103, the optical axis of the laser distance meter 102 and the facing direction of the reflector 101 are aligned with each other.

The processor 104 communicates with the laser distance meter 102 and the camera 103 via wireless communication such as wireless LAN or via wired communication using a cable (not illustrated), and performs arithmetic operation by using information obtained from the laser distance meter 102 and the camera 103. The processor 104 is preferably an arithmetic device including a display unit and an operation unit, such as a personal computer and a tablet. The processor 104 calculates a displacement amount between the radar axis and reference direction based on information obtained from the laser distance meter 102 and the camera 103, and information acquired from the radar to be adjusted. The radar axis is a direction of the radar transmission wave transmitted by the radar. The reference direction is a direction serving as a reference of the radar transmission wave transmitted by the radar.

Figure 2:
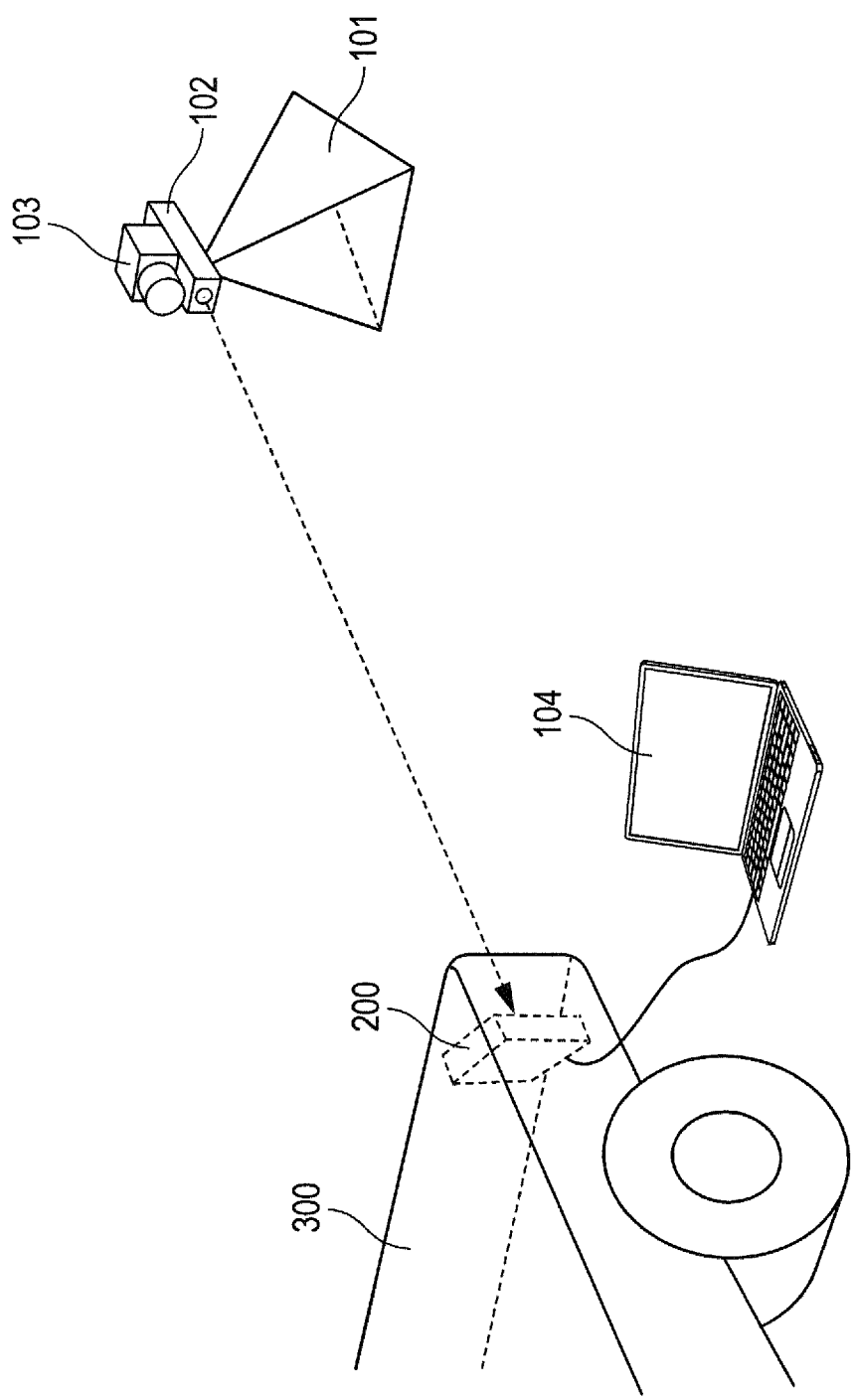
FIG. 2 illustrates an example of a positional relation between the radar axis displacement amount calculation device and a radar in the calculation of the axis displacement amount.

Hereinafter, a specific example of a method for calculating the radar axis displacement amount of the radar 200 by the radar axis displacement amount calculation device 100 is described. FIG. 2 illustrates an example of a positional relation between the radar axis displacement amount calculation device 100 and radar 200 in the calculation of the axis displacement amount.

FIG. 2 illustrates an example of the radar 200 installed at a front right corner with respect to the travel direction of a vehicle 300. For execution of axis adjustment of the radar 200, the position of the radar axis displacement amount calculation device 100 (reflector 101) is pre-adjusted such that the radar 200 and the reflector 101 directly face each other. With this pre-adjustment, the radar transmission wave transmitted from the radar 200 is allowed to enter the reflector 101 of the radar axis displacement amount calculation device 100. The radar axis displacement amount calculation device 100 (reflector 101) may be installed at any position where the radar transmission wave transmitted from the radar 200 is reflected by the reflector 101. However, the distance from the radar 200 to the radar axis displacement amount calculation device 100 is preferably a predetermined distance. The reason for this is described later.

The laser distance meter 102 receives reflection light of emitted laser light reflected by the radar 200, measures a distance from the radar axis displacement amount calculation device 100 to the radar 200 based on a phase difference between emitted light and reflected light, and generates distance information. Distance information generated by the laser distance meter 102 is transmitted to the processor 104, for example, via wireless LAN and used for correcting the distance.

Next, the camera 103 captures an object including the radar 200 and generates an image (first image) including the radar 200. The image generated by the camera 103 is transmitted to the processor 104, for example, via wireless LAN, similarly with the distance information generated by the laser distance meter 102.

The processor 104 calculates a displacement amount between the radar axis and reference direction, based on the image generated by the camera 103 and information generated by the radar 200 on a relative position between the radar 200 and radar axis displacement amount calculation device 100 (reflector 101) with the radar 200 as a reference. The method of calculating the radar axis displacement amount in the processor 104 is, for example, as follows.

First, the processor 104 performs image analysis of the image received from the camera 103 and generates first position information on a relative position between the camera 103 and radar 200 with the camera 103 as a reference. As a method of calculating the first position information, for example, the following method is available. The radar axis displacement amount calculation device 100 (camera 103) is pre-installed in various directions with respect to the radar 200. The camera 103 (radar axis displacement amount calculation device 100) captures an object including the radar 200 from one or more capturing positions and generates one or more reference images (second image). Then, the processor 104 generates a table associating one or more reference images and one or more capturing positions with each other. Hereinafter, the table is referred to as a reference image versus position table. The reference image versus position table is stored, for example, in a storage unit (not illustrated) connected to the processor 104.

When generating first position information based on an image received from the camera 103, the processor 104 performs arithmetic operation of the correlation between the image received from the camera 103 and one or more reference images included in the reference image versus position table pre-stored in the storage unit, and extracts a reference image having highest correlation with the received image. The processor 104 generates first position information based on the capturing position of the radar axis displacement amount calculation device 100 (camera 103) corresponding to the extracted reference image.

When a distance (second capturing distance) from the radar axis displacement amount calculation device 100 to the radar 200 during generation of the reference image versus position table and a distance (first capturing distance) from the radar axis displacement amount calculation device 100 to the radar 200 during calculation of the radar axis displacement amount are different from each other, correlation between the image received from the camera 103 (first image) and one or more reference images (second image) becomes lower. For this reason, it is preferable to set the second capturing distance and the first capturing distance to be equal to each other.

However, there may be a case where it is difficult to equalize the second capturing distance and the first capturing distance to each other due to the installation space and positioning accuracy of the radar axis displacement amount calculation device 100 (camera 103). In such a case, the processor 104 receives distance information (first capturing distance and second capturing distance) from the laser distance meter 102. The processor 104 converts the scale of one or more reference images (second image) based on the first capturing distance or converts the scale of an image (first image) generated by the camera 103 based on the second capturing distance. The processor 104 may perform arithmetic operation of the correlation by using a converted image.

Figure 3:
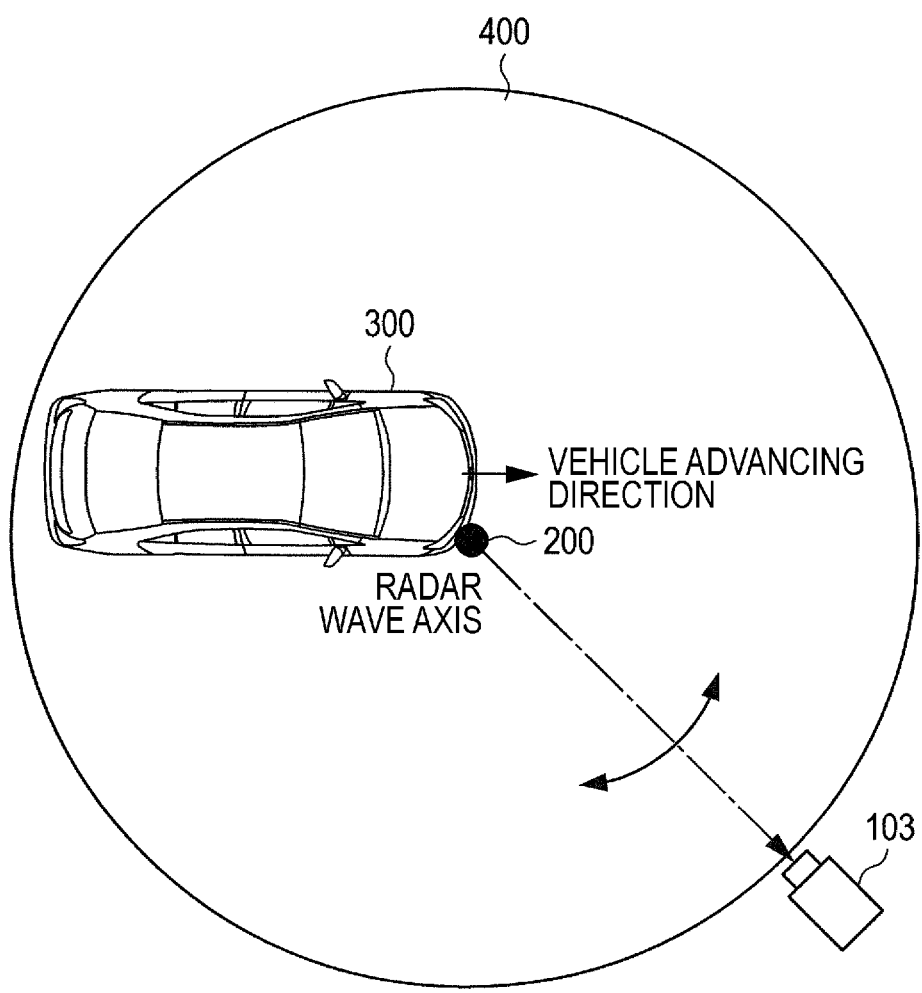
FIG. 3 illustrates an example of a method for generating a reference image versus position table.

A method of generating the reference image versus position table may be, for example, as follows. FIG. 3 illustrates an example of a method for generating the reference image versus position table. For example, a vehicle (first object) 300 on which the radar 200 is mounted is placed on a rotatable turn table 400. Installation position of the vehicle 300 is adjusted such that the radar 200 is positioned at the center of the turn table 400.

Radar axis displacement amount calculation device 100 (camera 103) is installed in the reference direction of the radar axis of the radar 200. The camera 103 captures the vehicle 300 and generates an image (second image) as a reference image including the position of the vehicle 300 for mounting the radar 200. Thereafter, the turn table 400 is rotated to a predetermined angle, and the camera 103 captures the vehicle 300 from the rotation angle. The camera 103 equidistant from the radar 200 captures the vehicle 300 from one or more capturing positions and generates one or more second images as one or more reference images. Then, the processor 104 generates the reference image versus position table by associating one or more reference images generated by the camera 103 and information indicating capturing positions (such as the direction viewed from the vehicle) of the camera 103 that has generated the images, with each other.

In the method of generating the reference image versus position table illustrated in FIG. 3, the reference image versus position table is generated in the state where the radar axis displacement amount calculation device 100 (camera 103) is placed on the outer peripheral of the turn table with the radar 200 as a center. Since distance from the radar axis displacement amount calculation device 100 (camera 103) to the radar 200 is the radius of the turn table, one or more reference images with the equal distance from the radar axis displacement amount calculation device 100 to the radar 200 are collected.

The method of generating reference image versus position table is not limited to the above method. For example, in the method of generating reference image versus position table, a three-dimensional coordinate system with the radar 200 as a center is set, and the radar axis displacement amount calculation device 100 is placed at a desired position (preferably, at a predetermined distance from the radar 200) on the three-dimensional coordinate system. The radar axis displacement amount calculation device 100 (camera 103) captures the vehicle 300 from one or more capturing positions on the three-dimensional coordinate system and generates one or more reference images. The processor 104 may generate the reference image versus position table by associating one or more reference images and the three-dimensional coordinates at one or more capturing positions with each other. In this case, data amount of the reference image versus position table becomes large, but installation position of the radar axis displacement amount calculation device 100 can be set in a three-dimensional manner.

Also, in the method of generating the reference image versus position table, three-dimensional computer aided design (CAD) data used for designing and manufacturing the vehicle 300 to which the radar 200 is attached may be used. For example, in the case where the radar axis displacement amount calculation device 100 is placed such that the radar axis displacement amount calculation device 100 and the vehicle 300 are put in a desired positional relation with each other, the radar axis displacement amount calculation device 100 can determine general shape data of the vehicle 300 with the radar axis displacement amount calculation device 100 as a reference by a numerical calculation such as polar coordinate transformation based on the three-dimensional CAD data of the vehicle 300. Then, the radar axis displacement amount calculation device 100 can set, for example, a distance, horizontal direction and vertical direction thereof with the radar 200 as a reference and thereby uniquely calculate the shape of the vehicle 300 observed from a set position. The radar axis displacement amount calculation device 100 may use the calculated value (three-dimensional data) as a reference image versus position table.

Now, description is back to the method of calculating the radar axis displacement amount by the processor 104. Next, the processor 104 acquires, from the radar 200, second position information on a relative position between the radar 200 and the radar axis displacement amount calculation device 100 (camera 103) with the radar 200 as a reference. The second position information is generated when a radar transmission wave transmitted by the radar 200 is reflected by the reflector 101 and the reflected wave is received by the radar 200. The processor 104 and the radar 200 are wire-connected with each other, for example, as illustrated in FIG. 2, and can communicate with each other. Alternatively, the processor 104 and the radar 200 may be configured to be able to communicate by wireless communication such as wireless LAN.

The processor 104 can calculate a difference between first position information and second position information, and a displacement between the radar axis and reference direction by comparing second position information acquired from the radar 200 and first position information calculated by the processor 104 with each other.

Figure 4:
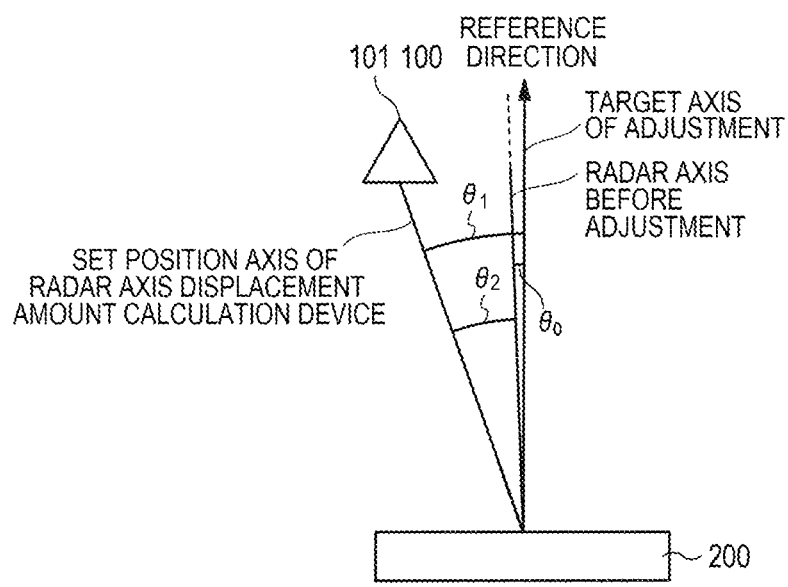
FIG. 4 illustrates a relation between first position information and second position information.

FIG. 4 illustrates a relation between the first position information and second position information. FIG. 4 illustrates only a positional relation in the horizontal direction between the radar axis displacement amount calculation device 100 and radar 200 for simplifying the description. $\theta_1$ is an installation angle of the radar axis displacement amount calculation device 100 (camera 103) with respect to the reference direction. $\theta_1$ corresponds to first position information generated when the processor 104 performs image analysis of the image generated by the camera 103.

$\theta_2$ is an installation angle of the radar axis displacement amount calculation device 100 (camera 103) including a displacement amount between the radar axis and reference direction. $\theta_2$ corresponds to the second position information generated by the radar 200. $\theta_0$ is a displacement angle of the radar axis with respect to the reference direction (displacement amount between radar axis and reference direction). $\theta_0$ is obtained from a difference between $\theta_1$ and $\theta_2$. The processor 104 is capable of calculating a displacement amount between the radar axis and reference direction.

FIG. 4 illustrates only a positional relation in the horizontal direction between the radar axis displacement amount calculation device 100 and radar 200. However, the processor 104 also is capable of calculating a displacement amount in a direction other than the horizontal direction based on the position of the radar axis displacement amount calculation device 100 on the three-dimensional coordinate system with the radar 200 as a center.

The radar axis of the radar 200 is adjusted based on the displacement amount between the radar axis and reference direction calculated by the processor 104. For example, an adjustment operator may adjust the mounting angle of the radar 200 so as to compensate for the displacement amount while referring to the displacement amount calculated by the processor 104. Alternatively, the radar 200 may receive the displacement amount from the processor 104 and correct a direction table used for deriving a direction in the radar 200 based on the displacement amount. Further, if the displacement amount between the first position information and second position information is outside a predetermined allowable range, the adjustment operator may adjust the mounting angle of the radar 200. If the displacement amount is within the allowable range, the radar 200 may correct the offset of the direction table. Thus, working hours required for adjustment of the radar axis of the radar 200 are reduced, and the radar axis of the radar 200 is adjusted in an efficient manner.

In the above description, installation position of the processor 104 is not limited particularly. However, the processor 104 is preferably installed separate from the reflector 101, the laser distance meter 102 and the camera 103 as illustrated in FIG. 1. For example, by configuring the processor 104 separately from the reflector 101, the laser distance meter 102 and the camera 103, weight and size of the reflector 101, the laser distance meter 102 and the camera 103 can be reduced and installation of the radar axis displacement amount calculation device 100 excluding the processor 104 can be facilitated. In the embodiment described above, and modified examples and application examples described below, the processor 104 is not installed at the installation position of the radar axis displacement amount calculation device 100 but at a different position. According to the present disclosure, installation position of the processor 104 is not limited particularly. The processor 104 may be installed, for example, in the vicinity of the installation position of the reflector 101, the laser distance meter 102 and the camera 103 or in the vicinity of the radar 200 to be adjusted. Alternatively, the processor 104 may be included, for example, in a car navigation device mounted on the vehicle 300.

As described above, the radar axis displacement amount calculation device 100 according to the embodiment of the present disclosure includes: the reflector 101 by which the radar transmission wave transmitted by the radar 200 attached to the first object is reflected in the arrival direction of the radar transmission wave; the camera 103 that generates the first image including the portion of the first object to which the radar 200 is attached; and the processor 104 that calculates the displacement amount between the radar axis being the direction of the radar transmission wave transmitted by the radar 200, and the reference direction being the direction serving as the reference of the radar transmission wave transmitted by the radar 200 by using the first image and the arrival direction of the radar transmission wave. The camera 103 has the optical axis aligned with the facing direction of the reflector 101, and the processor 104 generates first position information on the relative position between the camera 103 and the radar 200 with the camera 103 as the reference by using the first image; acquires, from the radar 200, second position information on the relative position between the radar 200 and the reflector 101 with the radar 200 as the reference, the second position information being generated by using the arrival direction of the radar transmission wave; and calculates the displacement amount by comparing the first position information and the second position information with each other.

Thus, the radar axis displacement amount calculation device 100 pre-adjusted such that the facing direction of the reflector 101 and the optical axis of the camera 103 are aligned with each other is capable of grasping a correct positional relation between the radar axis displacement amount calculation device 100 (camera 103) and the vehicle 300 (radar 200) based on the analysis result of the image of the vehicle 300 captured by the camera 103. Thus, the radar axis displacement amount calculation device 100 may be installed at a desired position where the radar transmission wave of the radar 200 is able to enter the reflector 101, and thereby installation flexibility of the radar axis displacement amount calculation device 100 is enhanced.

The processor 104 performs arithmetic operation of the correlation between the image (first image) generated by the camera 103 and one or more reference images (second image) and thereby generates first position information indicating a relative positional relation between the radar axis displacement amount calculation device 100 and radar 200. For this reason, it is preferable to equalize a capturing distance (first capturing distance) during calculation of the radar axis displacement amount and a capturing distance (second capturing distance) during generation of the reference image to each other. However, the radar axis displacement amount calculation device 100 receives the distances (first capturing distance and second capturing distance) from the radar axis displacement amount calculation device 100 to the radar 200, the distances being obtained by the laser distance meter 102, and converts the scale of an image (first image) generated by the camera 103 based on the second capturing distance, or converts the scale of one or more reference images (second image) based on the first capturing distance. Thus, the first capturing distance and second capturing distance do not have to be equal, and thereby installation flexibility of the radar axis displacement amount calculation device 100 is further enhanced.

Meanwhile, in the embodiment described above, one or more reference images are generated by capturing the vehicle 300 with the camera 103 from various directions in advance. However, generation of one or more reference images requires a lot of time and efforts. To save time and efforts, a method such as described below may be adopted in the present disclosure. That is, a predetermined pattern is provided at a predetermined position of the vehicle 300, and when the camera 103 generates an image including the radar 200, an image including the pattern is generated to calculate the displacement amount. Then, the view of the pattern in the image and the position of the camera 103 are associated with each other in advance, and during calculation of the displacement amount, first position information is generated based on the view. The number of patterns is not limited to one. Estimation accuracy can be enhanced by providing multiple patterns. The predetermined pattern may have a desired shape, and there is no need to newly provide a pattern for calculation of the displacement amount. For example, an emblem provided on the vehicle 300 in advance for enhancement of the design feature may be utilized as the predetermined pattern.

In the embodiment described above, the radar axis displacement amount calculation device 100 calculates an axis displacement amount of the radar 200 provided on the vehicle 300. However, the present disclosure is not limited thereto. For example, the radar axis displacement amount calculation device 100 may calculate an axis displacement amount of the radar 200 provided on an object other than the vehicle 300.

In the embodiment described above, the laser distance meter 102 measures a distance from the radar axis displacement amount calculation device 100 to the radar 200, and corrects an image generated by the camera 103 before the processor 104 analyzes the image based on the distance. However, the laser distance meter 102 does not have to be used in the present disclosure.

Figure 5:
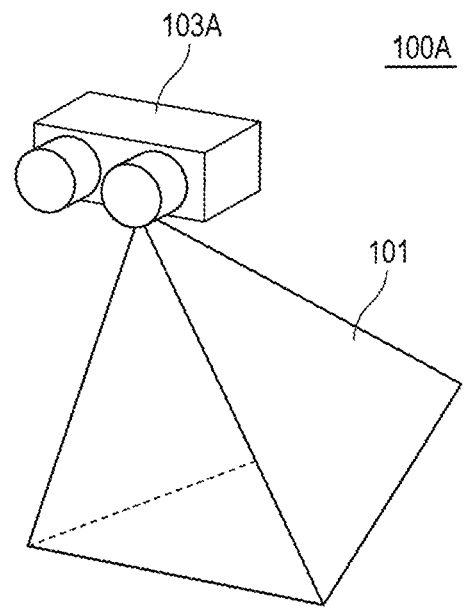
FIG. 5 illustrates a first modified example of the embodiment according to the present disclosure.

FIG. 5 illustrates a first modified example of the embodiment according to the present disclosure. A radar axis displacement amount calculation device 100A according to the first modified example illustrated in FIG. 5 includes a stereo camera 103A instead of the laser distance meter 102 and the camera 103 of the radar axis displacement amount calculation device 100. The stereo camera 103A generates an image having depth information as well. Therefore, the processor 104 can perform image correction according to a distance from the radar axis displacement amount calculation device 100 to the radar 200 based on the image.

Figure 6:
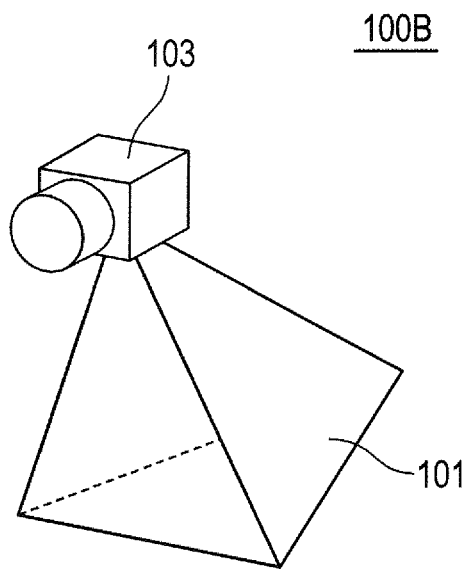
FIG. 6 illustrates a second modified example of the embodiment according to the present disclosure.

FIG. 6 illustrates a second modified example of the embodiment according to the present disclosure. A radar axis displacement amount calculation device 100B according to the second modified example illustrated in FIG. 6 is the radar axis displacement amount calculation device 100 not including the laser distance meter 102. In this case, since the scale change ratio of the image is not known, operation amount required for correlation operation of the image in the processor 104 becomes large. However, the processor 104 can deal with the operation by searching for the scale and direction providing a highest correlation.

Figure 7:
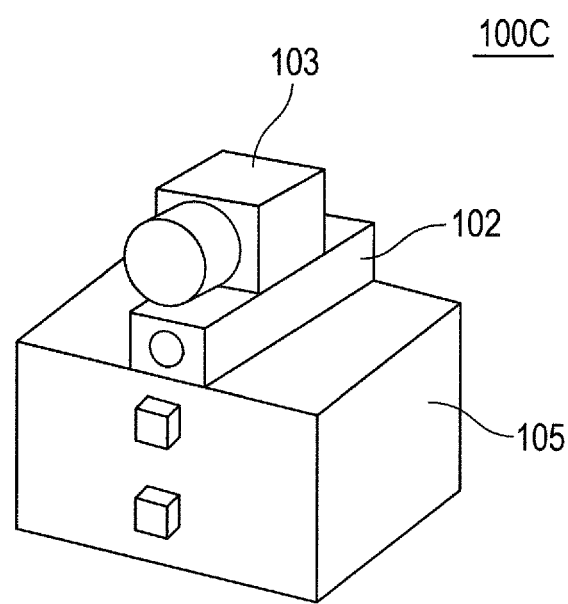
FIG. 7 illustrates a third modified example of the embodiment according to the present disclosure.

Further, FIG. 7 illustrates a third modified example of the embodiment according to the present disclosure. A radar axis displacement amount calculation device 100C according to the third modified example illustrated in FIG. 7 includes a target simulator 105 instead of the reflector 101 of the radar axis displacement amount calculation device 100. The target simulator 105 includes, for example, a delay circuit, a frequency conversion circuit, and so on, generates a reflected wave by delaying a received radar transmission wave or performing frequency conversion thereof, and reflects the reflected wave in an arrival direction of the radar transmission wave. The target simulator 105 can vary relative speed, distance, and so on of the radar axis displacement amount calculation device 100 with the radar 200 as a reference in a simulative manner by adjusting the delay time or conversion frequency. Therefore, relative position and the speed of the radar axis displacement amount calculation device 100 with respect to the radar 200 can be set as desired by controlling the target simulator 105 in a suitable manner. Thus, second position information on a relative position between the radar 200 and radar axis displacement amount calculation device 100 with the radar 200 as a reference can be set as desired, and thereby the radar axis displacement amount calculation device 100C can calculate the displacement amount in a suitable manner.

Figure 8:
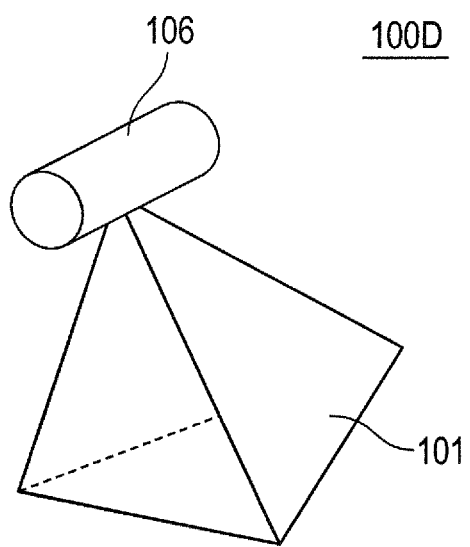
FIG. 8 illustrates a fourth modified example of the embodiment according to the present disclosure.

FIG. 8 illustrates a fourth modified example of the embodiment according to the present disclosure. A radar axis displacement amount calculation device 100D according to the fourth modified example illustrated in FIG. 8 includes a three-dimensional laser scanning device 106 instead of the camera 103 of the radar axis displacement amount calculation device 100. The three-dimensional laser scanning device 106 measures a distance to an object, for example, by a method called a time of flight (TOF) method that measures a period of time taken until a laser light directed to the object returns. The three-dimensional laser scanning device 106 has a mechanism capable of changing the laser irradiation direction three-dimensionally, that is, in horizontal and vertical directions, and thus can grasp the shape of the vehicle 300 including the radar 200 to be adjusted in a three-dimensional manner.

In the fourth modified example, when a value calculated with three-dimensional CAD data of the vehicle 300 is used as a reference image versus position table, the radar axis displacement amount calculation device 100D clearly detects a peak of the correlation value in comparison with two-dimensional data by performing arithmetic operation of the correlation between three-dimensional data of the vehicle 300 including the radar 200 acquired by the three-dimensional laser scanning device 106 and three-dimensional reference data of the reference image versus position table. Therefore, even when the radar 200 has a three-dimensional detection range, the radar axis displacement amount calculation device 100D calculates the displacement amount in a suitable manner.

FIRST APPLICATION EXAMPLE

Figure 9:
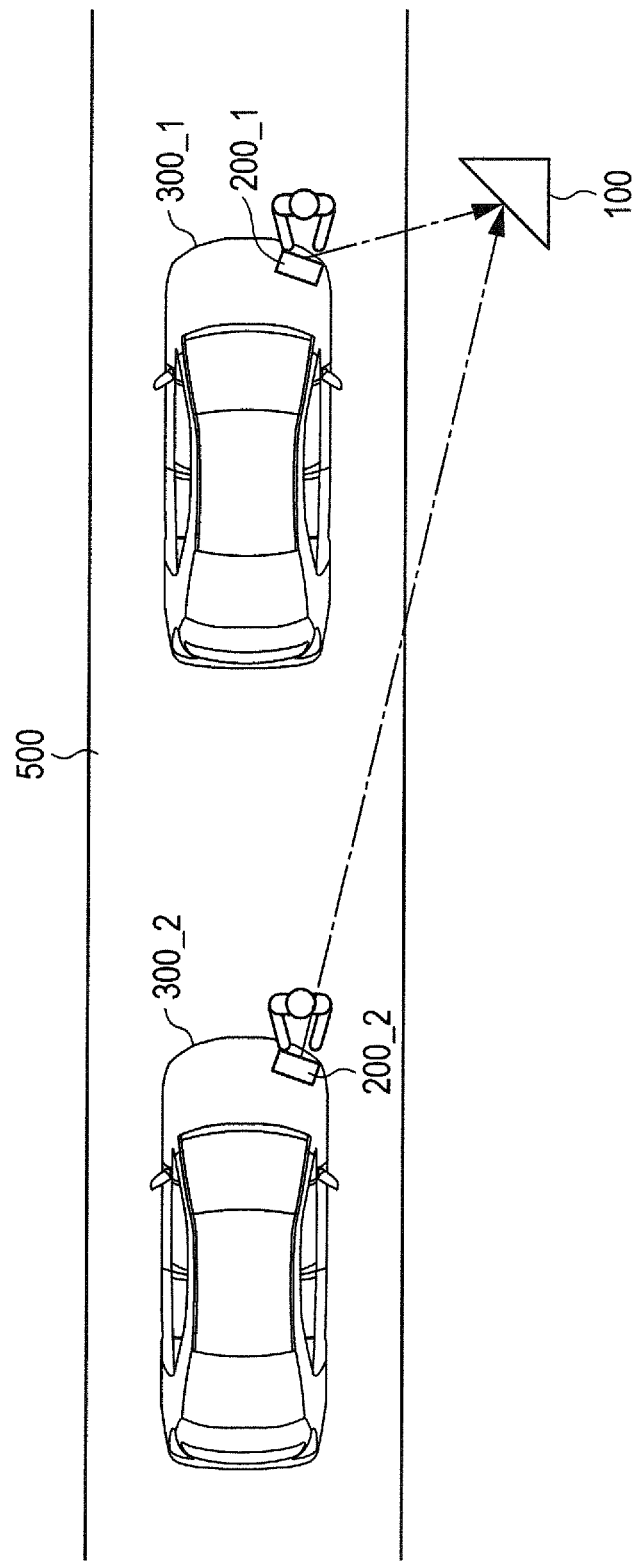
FIG. 9 illustrates a first application example of the radar axis displacement amount calculation device.

Hereinafter, an application example of the radar axis displacement amount calculation device 100 according to the above embodiment of the present disclosure is described. FIG. 9 illustrates a first application example of the radar axis displacement amount calculation device 100.

As illustrated in FIG. 9, in the first application example of the radar axis displacement amount calculation device 100, a vehicle 300_1 is disposed on a belt conveyor 500, and the radar axis displacement amount calculation device 100 is placed outside the belt conveyor 500. The belt conveyor 500 moves, for example, in the upward direction in FIG. 9, and along with this motion, the vehicle 300_1 also moves in the upward direction in FIG. 9. Then, the radar axis displacement amount calculation device 100 calculates the displacement amount of the radar axis of the radar 200_1 mounted on the vehicle 300_1. The displacement amount calculated by the radar axis displacement amount calculation device 100 is displayed, for example, on a display device (not illustrated) installed in the vicinity of each of the radars 200_1. The adjustment operator can adjust the radar axis based on the displacement amount.

The belt conveyor 500 may continue on moving at a predetermined speed, or when a predetermined number of radars are located at positions of the reflector 101 where the radar transmission wave is incident, the belt conveyor 500 may stop moving and stay thereat until completion of displacement amount calculation and adjustment of the radar axis. In the case where the belt conveyor 500 stops when the radar 200_1 is located at the position of the reflector 101 where the radar transmission wave is incident, displacement amount calculation and adjustment of the radar axis of radars 200_1 can be performed by the method described in the above embodiment.

Meanwhile, in the case where the belt conveyor 500 continues on moving, for example, at a constant speed v, a relative position between the radar axis displacement amount calculation device 100 and a vehicle 300_1 moved by the belt conveyor 500 varies continuously. That is, first position information obtained through image analysis by the processor 104 and second position information generated by the radar 200_1 vary as the time elapses. Calculation of the radar axis displacement amount needs to be adaptive to such a change of position information.

As a method adaptive to the change with time of position information, for example, the following method is available. As the vehicle 300_1 is moving, a first delay time required for generating first position information by analyzing an image generated by the camera 103, and a second delay time required for generating second position information by the radar 200_1 occur. A time difference between the first delay time and second delay time is measured in advance and used as an offset time when the processor 104 calculates the displacement amount.

Alternatively, when calculating the displacement amount of the moving radar 200_1, the processor 104 synchronizes the operation start timing of the camera 103 and radar 200 and acquires a time stamp for each timing of the camera image acquisition and for each timing of the radar detection. The time stamp is added to the first position information and second position information. When calculating a difference between the first position information and second position information, the processor 104 may compare closest time stamps with each other.

As illustrated in FIG. 9, not only the vehicle 300_1 but also multiple vehicles such as a vehicle 300_2 are placed on the belt conveyor 500. The number of vehicles placed on the belt conveyor 500 is not limited to two, but may be more (three or more). In this case, the radar axis displacement amount calculation device 100 calculates the displacement amount of the radar axis only for a radar (in FIG. 9, radars 200_1 and 200_2) that makes the radar transmission wave incident on the reflector 101, among multiple radars on the belt conveyor 500. For a vehicle on which one of the other radars is placed, the radar axis displacement amount calculation device 100 may calculate the displacement amount of the radar axis when the vehicle is moved by the belt conveyor 500 to a position where the radar transmission wave can be incident on the reflector 101.

As illustrated in FIG. 9, in a case where radars 200_1 and 200_2 are located at positions where the radar transmission wave can be made incident on the radar axis displacement amount calculation device 100, the radar axis displacement amount calculation device 100 can simultaneously start adjustment of not only the radar 200_1 located closer thereto but also the radar 200_2 located at the back thereof. Thus, continuous displacement amount calculation and adjustment of multiple radars is performed without temporarily stopping the belt conveyor 500, and thereby costs for adjustment of the radar can be reduced.

Simultaneous displacement amount calculation for the radars 200_1 and 200_2 by the radar axis displacement amount calculation device 100 is described. For simplifying the description, FIG. 9 illustrates horizontal position information (first position information) of the radars 200_1 and 200_2 with respect to the camera 103.

An image including two radars 200_1 and 200_2 is generated by the camera 103 of the radar axis displacement amount calculation device 100. The processor 104 performs image analysis of the image including two radars 200_1 and 200_2 and generates first position information for each radar. The image analysis may be performed by one processor 104 as in the embodiment described above or may be performed individually, for example, by processors 104_1 and 104_2 provided for the radars.

In the case where the processors 104_1 and 104_2 are provided for the radars, the processors 104_1 and 104_2 may be installed in the vicinity of their corresponding radars or may be collectively installed at a remote location. In the description below, calculation of the displacement amount by one processor 104 is described. In the case where the displacement amount is calculated by two processors 104_1 and 104_2, processing for the radar 200_1 may be performed by the processor 104_1, and processing for the radar 200_2 may be performed by the processor 104_2.

Next, the processor 104 acquires second position information from the radars 200_1 and 200_2 and calculates the displacement amount based on a difference between the first position information and second position information. The processor 104 causes, for example, a display device in the vicinity of the radar 200_1 to display a displacement amount of the radar axis of the radar 200_1, and a display device in the vicinity of the radar 200_2 to display a displacement amount of the radar axis of the radar 200_2. Thus, the adjustment operator can adjust the radar axis based on a displacement amount displayed on each display device.

As described above, in the first application example, as the belt conveyor 500 operates, the positions of the radars 200_1 and 200_2 with respect to the radar axis displacement amount calculation device 100 (camera 103) vary along with elapse of the time. For this reason, the radar axis displacement amount calculation device 100 of the first application example calculates the displacement amount by generating images of radars 200_1 and 200_2 from various directions, and thereby, for example, reduces performance difference among multiple radars.

In the first application example, in a case where the operation speed v of the belt conveyor 500 is a constant speed, performance of the radar is evaluated based on the Doppler frequency of the radar axis displacement amount calculation device 100 fixedly installed with respect to radars 200_1 and 200_2 moved at the constant speed. A specific method thereof is described below.

In the case where the belt conveyor 500 always operates at a constant speed v, a relative speed of the radar axis displacement amount calculation device 100 (reflector 101) detected by radars 200_1 and 200_2 is not 0. This is because the radio frequency of the radar reflection wave is Doppler-shifted. That is, as the belt conveyor 500 operates, a relative position (direction) of the reflector 101 with respect to radars 200_1 and 200_2 varies, and thereby a Doppler shift component of an apparent relative speed of the reflector 101 with respect to moving radars 200_1 and 200_2 varies.

Figure 10:
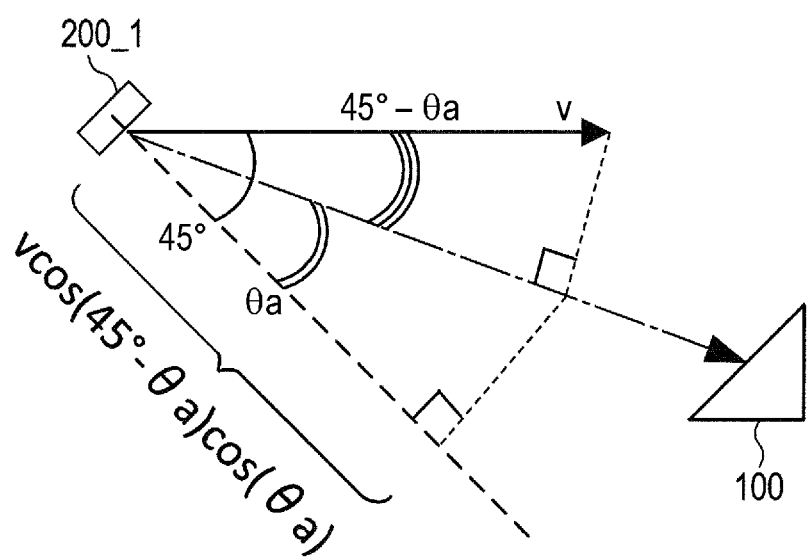
FIG. 10 illustrates a positional relation between a fixedly-installed radar axis displacement amount calculation device and a radar moving at a constant speed.

FIG. 10 illustrates a positional relation between an installed-and-fixed radar axis displacement amount calculation device 100 and a radar 200_1 moving at a constant speed. In FIG. 10, the reference direction of the radar 200_1 is inclined by 45 degrees with respect to the moving direction or advancing direction of the vehicle 300_1 illustrated in FIG. 9. In FIG. 10, assume that the position (direction) of the radar axis displacement amount calculation device 100 (reflector 101) with respect to the radar 200_1 is θa.

In this case, the relative speed component in the reference direction of the radar axis displacement amount calculation device 100 with respect to the radar 200_1 is v×cos(45°−θa)×cos(θa). Thus, the Doppler frequency fd=2×{v×cos(45°−θa)×cos(θa)}×fc/C (fc: frequency of the radar transmission wave, C: velocity of light) is detected by the radar 200_1. That is, the Doppler frequency is a function of the direction θa of the radar axis displacement amount calculation device 100 detected by the radar 200_1.

That is, when the relation between the Doppler frequency fd' measured in the calculation of actual axis displacement amount and the direction θa does not match the above relational expression, the radar axis of the radar 200_1 is determined as being deviating from the reference direction. Therefore, the processor 104 can detect a displacement of the radar axis based on the measured value fd' of the Doppler frequency in the calculation of displacement amount. Thus, for example, when adjustment of the radar axis of radars 200_1 and 200_2 by the radar axis displacement amount calculation device 100 is made to a certain extent, it can be determined whether the adjustment by the radar axis displacement amount calculation device 100 is made in a suitable manner, by checking whether the detected Doppler frequency fd' and direction θa are in the above relation. That is, the radar axis displacement amount calculation device 100 analyzes the image generated by the camera 103 and detects not only positions detected by radars 200_1 and 200_2 but also the displacement amount of the radar axis of radars 200_1 and 200_2 based on the detected Doppler frequency, and thereby evaluates radars 200_1 and 200_2 multilaterally.

SECOND APPLICATION EXAMPLE

Figure 11:
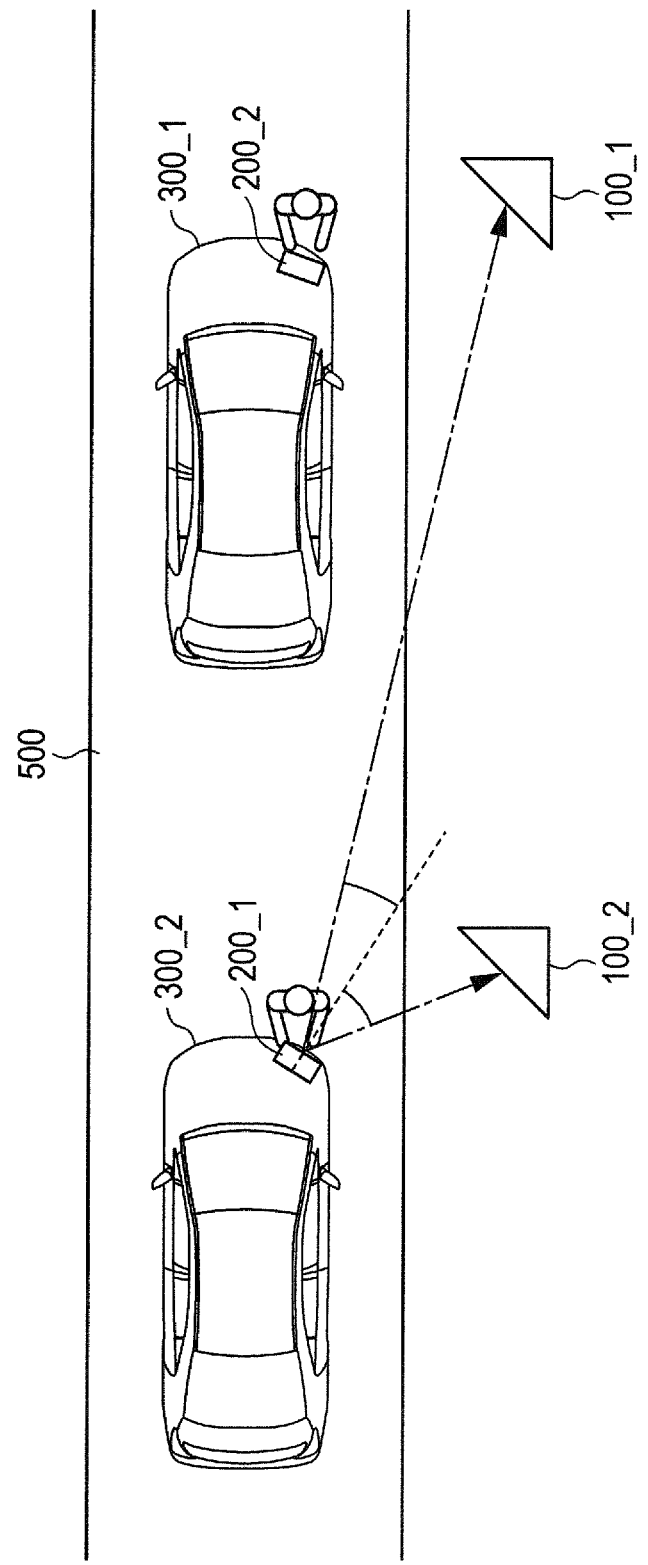
FIG. 11 illustrates a second application example of the radar axis displacement amount calculation device.

FIG. 11 illustrates a second application example of the radar axis displacement amount calculation device 100. In the second application example, multiple radar axis displacement amount calculation devices are installed unlike the first application example where one radar axis displacement amount calculation device is installed. In the second application example, as illustrated in FIG. 11, radar axis displacement amount calculation devices 100_1 and 100_2 are installed, and radars 200_1 and 200_2 simultaneously detect radar axis displacement amount calculation devices 100_1 and 100_2 located at positions (directions) different from each other. Thus, radars 200_1 and 200_2 can acquire second position information of radar axis displacement amount calculation devices 100_1 and 100_2 to be detected, and thereby a direction table used for deriving the direction in radars 200_1 and 200_2 can be corrected accurately.

THIRD APPLICATION EXAMPLE

Figure 12:
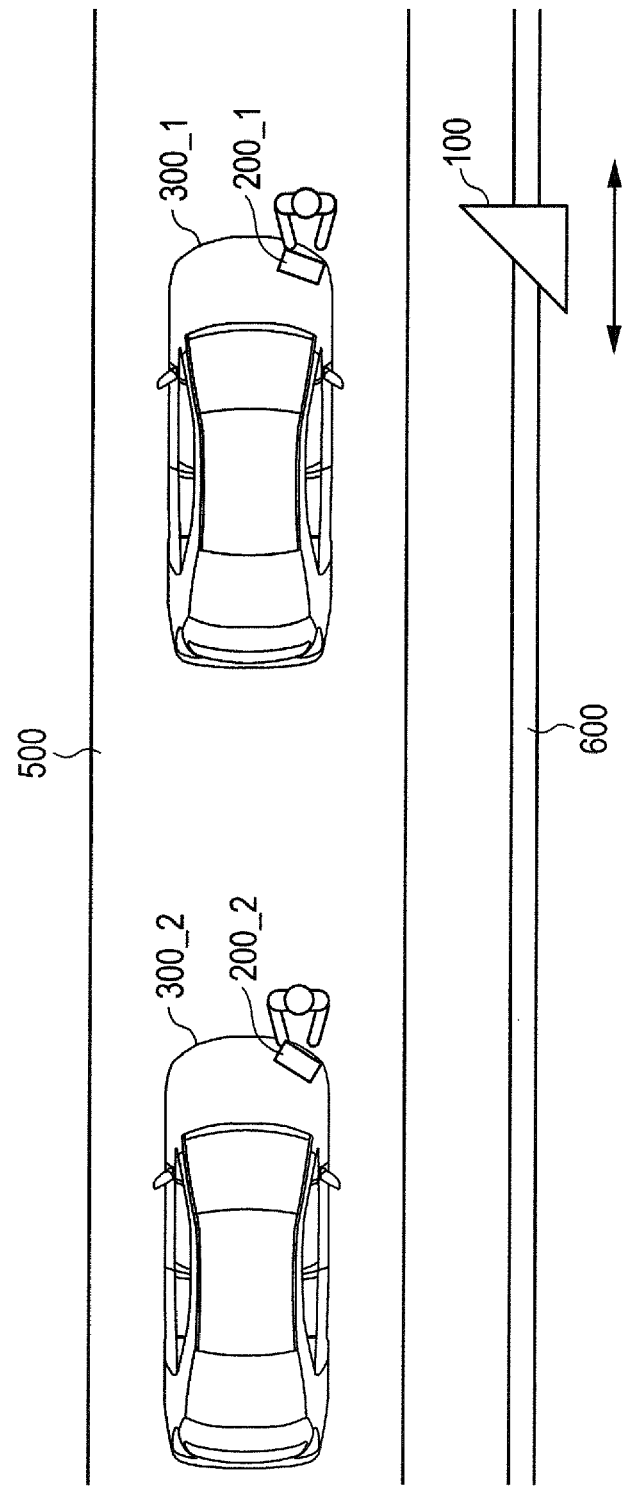
FIG. 12 illustrates a third application example of the radar axis displacement amount calculation device.

FIG. 12 illustrates a third application example of the radar axis displacement amount calculation device 100. In the third application example, the radar axis displacement amount calculation device 100 of the first application example can move on a rail 600 laid in parallel with the belt conveyor 500.

In the first and second application examples described above, when the belt conveyor 500 continues on operating, too fast operation speed v of the belt conveyor 500 reduces a time for calculation of the displacement amount by the radar axis displacement amount calculation device 100. In such a case, there may occur a situation where the radar axis displacement amount calculation device 100 is not able to calculate the displacement amount in an appropriate manner. In the third application example, to prevent occurrence of such situation, the radar axis displacement amount calculation device 100 moves on the rail 600 at the same speed as the operation speed v of the belt conveyor 500. Thus, the radar axis displacement amount calculation device 100 is brought in an apparently stationary state with respect to radars 200_1 and 200_2.

In the third application example, the radar axis displacement amount calculation device 100 moves on the rail 600 in the same direction as the operation direction of the belt conveyor 500, and when calculation of the axis displacement amount for one radar finishes, the radar axis displacement amount calculation device 100 moves backward on the rail 600 up to the position of a next radar. Thus, the axis displacement amount of multiple radars can be calculated continuously. The radar axis displacement amount calculation device 100 may keep the moving speed constant during calculation of the axis displacement amount and stop moving once the axis displacement amount is calculated. As described in the second application example, the measured value of the Doppler frequency detects whether the radar axis is adjusted in a suitable manner.

A speed of the radar axis displacement amount calculation device 100 moving on the rail 600 may be determined, for example, such that a distance from the radar axis displacement amount calculation device 100 to the radar 200_1 detected by the laser distance meter 102 is constant.

FOURTH APPLICATION EXAMPLE

Figure 13:
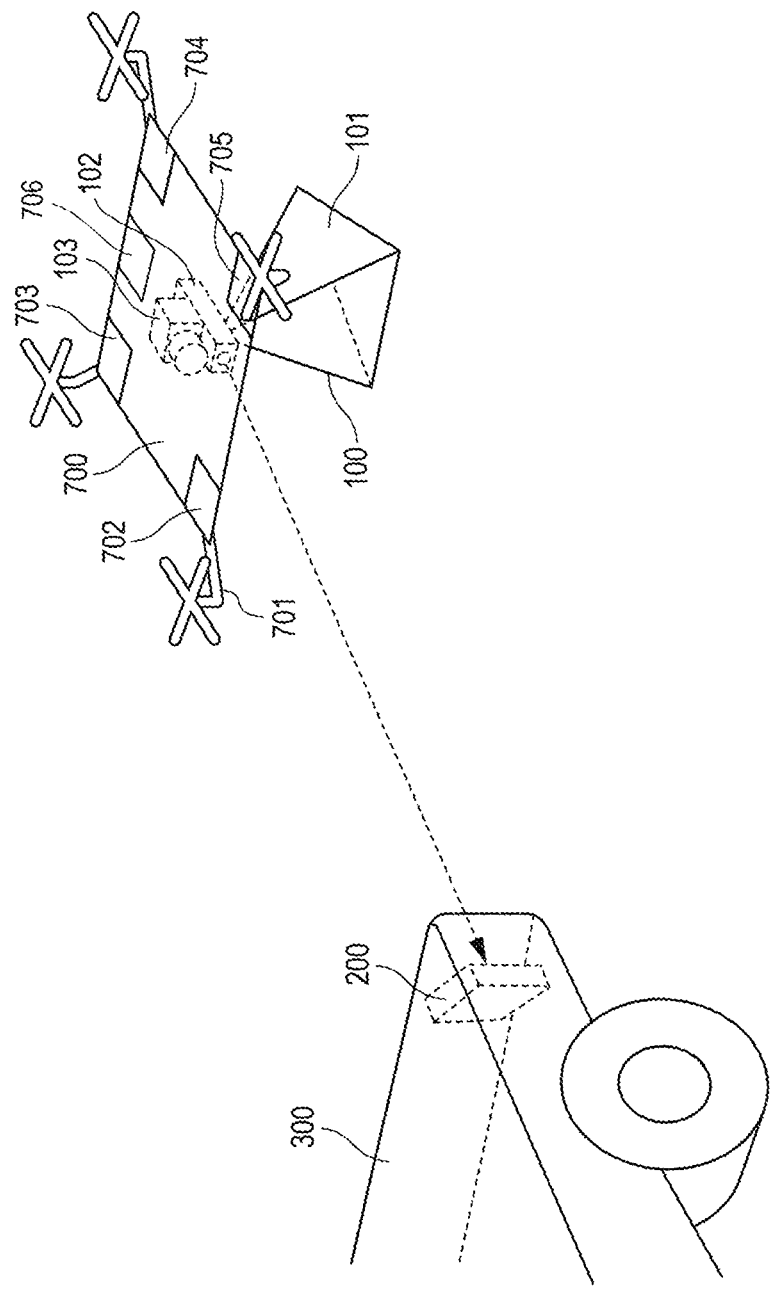
FIG. 13 illustrates a fourth application example of the radar axis displacement amount calculation device.

FIG. 13 illustrates a fourth application example of the radar axis displacement amount calculation device 100. In the fourth application example, the radar axis displacement amount calculation device 100 is mounted on a small unmanned aerial device 700. As illustrated in FIG. 13, the small unmanned aerial device 700 includes a flight device such as a propeller 701, and sensors such as an acceleration sensor 702, a gyro sensor 703, an airspeed meter 704, and an altimeter 705.

The small unmanned aerial device 700 flies based on an image generated by the camera 103 such that the reflector 101 is in a detection range of the radar 200 to be adjusted. Flight of the small unmanned aerial device 700 is autonomously controlled, for example, by a software program based on, for example, an image generated by the camera 103 and detection results by the above sensors. A flight controller 706 for controlling the flight of the small unmanned aerial device 700 may be mounted on the small unmanned aerial device 700, or may be installed, for example, at a predetermined location on the ground for controlling the flight of the small unmanned aerial device 700 via wireless communication, and so on.

The processor 104 of the radar axis displacement amount calculation device 100 generates first position information based on an image generated by the camera 103 and a height from the ground detected by the altimeter 705. Thereafter, in the same manner as the embodiment described above, the processor 104 compares second position information generated by the radar 200 and first position information with each other and thereby calculates a displacement amount between the radar axis and reference direction.

While the radar axis displacement amount calculation device 100 calculates the displacement amount, the flight controller of the small unmanned aerial device 700 preferably controls the radar axis displacement amount calculation device 100 such that the radar axis displacement amount calculation device 100 is relatively stationary with respect to the radar 200. The flight controller controls rate of rotation, inclination and so on of the propeller 701 based on the result of image analysis by the processor 104 and distance information measured by the laser distance meter 102. Then, after calculation of the displacement amount has been made to a certain extent, the flight controller causes the small unmanned aerial device 700 to fly such that the radar axis displacement amount calculation device 100 moves in one direction with respect to the radar 200. Thus, the measured value of the Doppler frequency detects whether the radar axis is adjusted in a suitable manner.

Alternatively, the flight controller may positively move the small unmanned aerial device 700. Thus, a Doppler frequency is observed by the radar 200. When the small unmanned aerial device 700 flies in such a manner that a distance from the radar axis displacement amount calculation device 100 to the radar 200 varies, the Doppler frequency detected by the radar 200 varies. When the flight controller causes the small unmanned aerial device 700 to fly in a certain direction at a predetermined airspeed, a theoretical value of the Doppler frequency can be calculated based on the moving direction by the same method as the first application example. Determination as to whether the radar axis is adjusted is made based on the measured value of the Doppler frequency.

Flight route of the small unmanned aerial device 700 is determined by the flight controller based on detection results of the acceleration sensor 702 and the gyro sensor 703 and an image generated by the camera sensor 103. Such information may be transmitted to the processor 104 and used for the image analysis. Thus, the processor 104 can perform integral analysis.

Time stamp may be added when second position information is detected by the radar 200, when an image is analyzed by the radar axis displacement amount calculation device 100 on the small unmanned aerial device 700, and when detected by sensors on the small unmanned aerial device 700. Thus, similarly with the first application example, adverse effects due to the difference in data acquisition timing is be reduced.

FIFTH APPLICATION EXAMPLE

Figure 14:
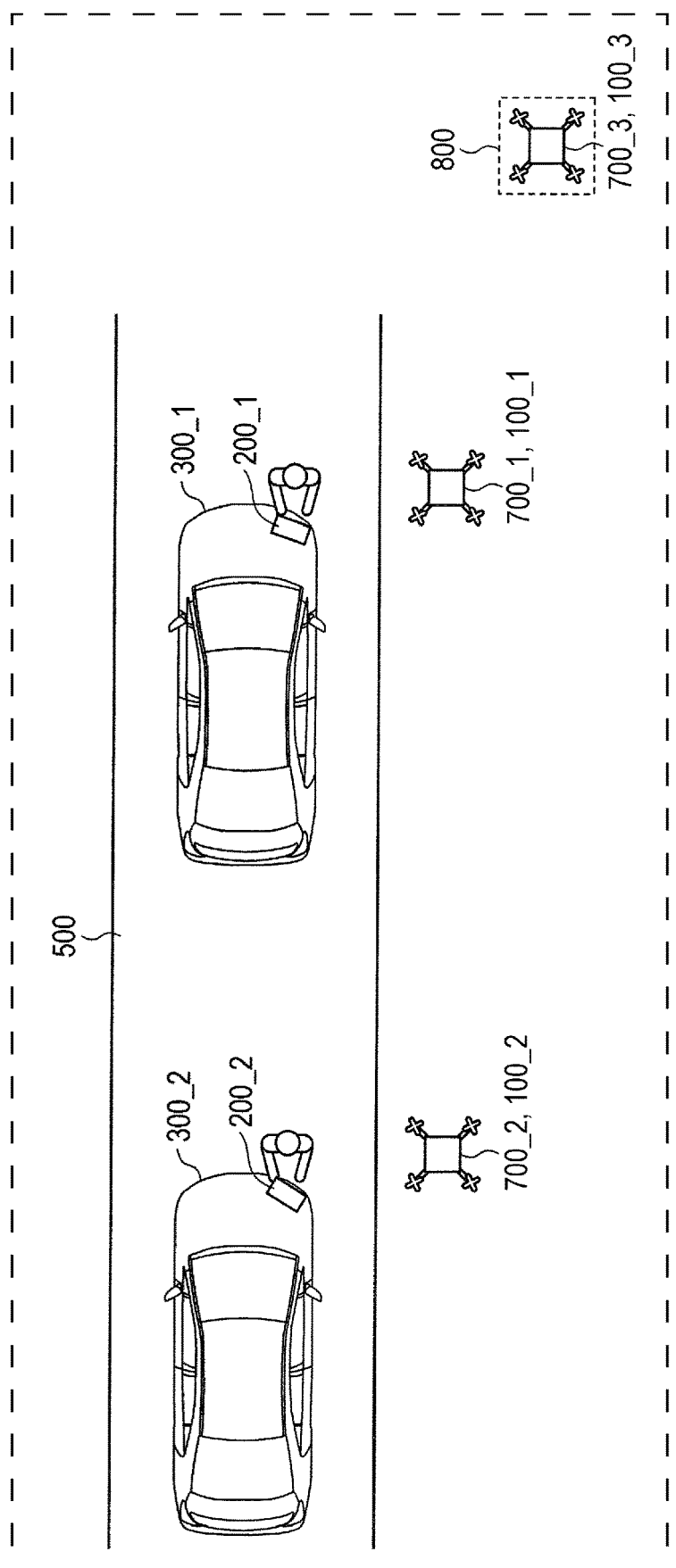
FIG. 14 illustrates a fifth application example of the radar axis displacement amount calculation device.

FIG. 14 illustrates a fifth application example of the radar axis displacement amount calculation device 100. As illustrated in FIG. 14, in the fifth application example, radar axis displacement amount calculation devices 100_1 and 100_2 of the second application example are mounted on the small unmanned aerial device 700 of the fourth application example. That is, a situation is assumed where small unmanned aerial devices 700_1 and 700_2 with radar axis displacement amount calculation devices 100_1 and 100_2 mounted thereon are used. Small unmanned aerial devices 700_1 and 700_2 cause radar axis displacement amount calculation devices 100_1 and 100_2 to stop or move as in the above application examples, and thereby radar axis displacement amount calculation devices 100_1 and 100_2 can calculate the axis displacement amount of radars 200_1 and 200_2 in a suitable manner.

As illustrated in FIG. 14, charging equipment 800 may be installed such that out of multiple small unmanned aerial devices 700, a small unmanned aerial device 700 whose charge amount is lower than a specific level automatically moves to the charging equipment 800 to perform charging. To prevent shortage in the number of small unmanned aerial devices 700 (radar axis displacement amount calculation device 100) during the charging, a spare small unmanned aerial device 700_3 such as illustrated in FIG. 14 may be prepared.

Figure 15:
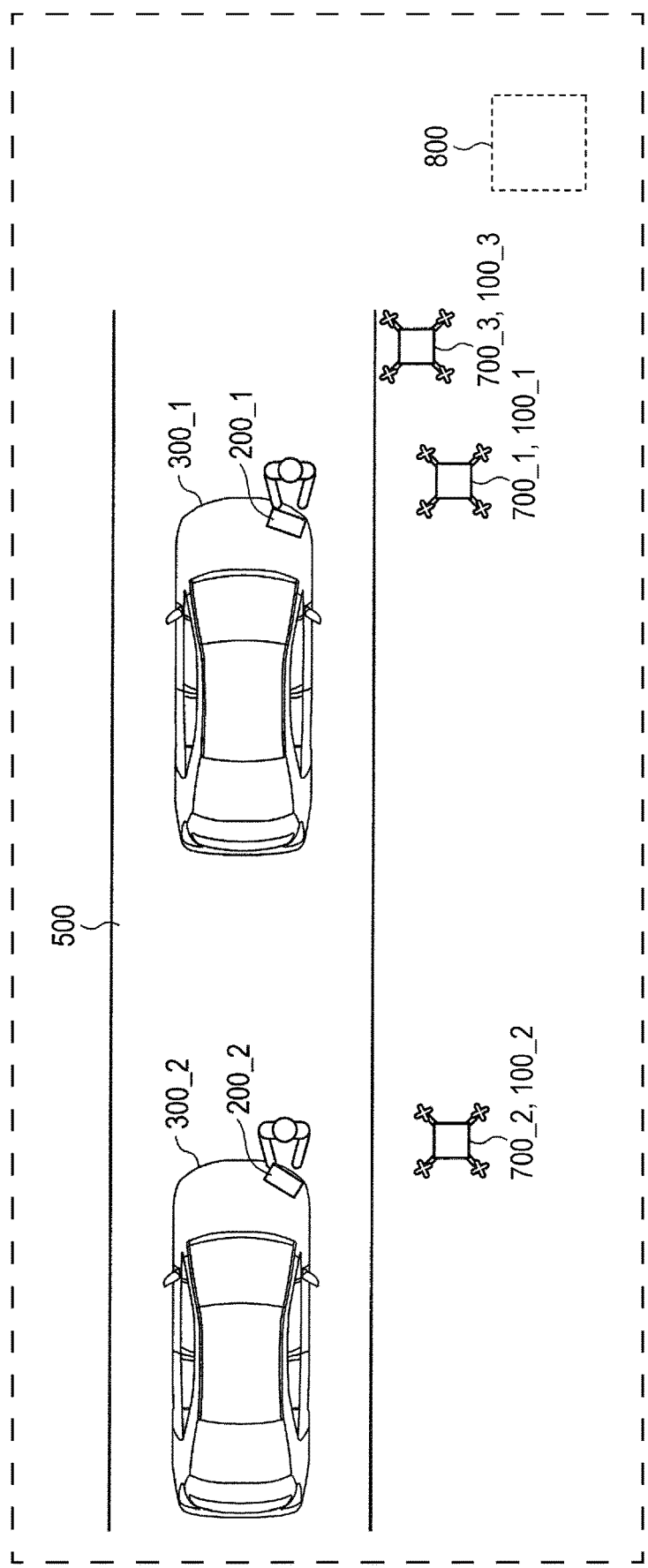
FIG. 15 illustrates an example of using a spare small unmanned aerial device.

Further, after completion of the charging, the spare small unmanned aerial device 700_3 may calculate the axis displacement amount as illustrated in FIG. 15. FIG. 15 illustrates an example of utilizing the spare small unmanned aerial device 700_3. The small unmanned aerial device 700_1 and the spare small unmanned aerial device 700_3 can move to different locations equidistant from the radar 200_1 to be adjusted, and two radar axis displacement amount calculation devices 100_1 and 100_2 can calculate the displacement amount.

SIXTH APPLICATION EXAMPLE

Figure 16:
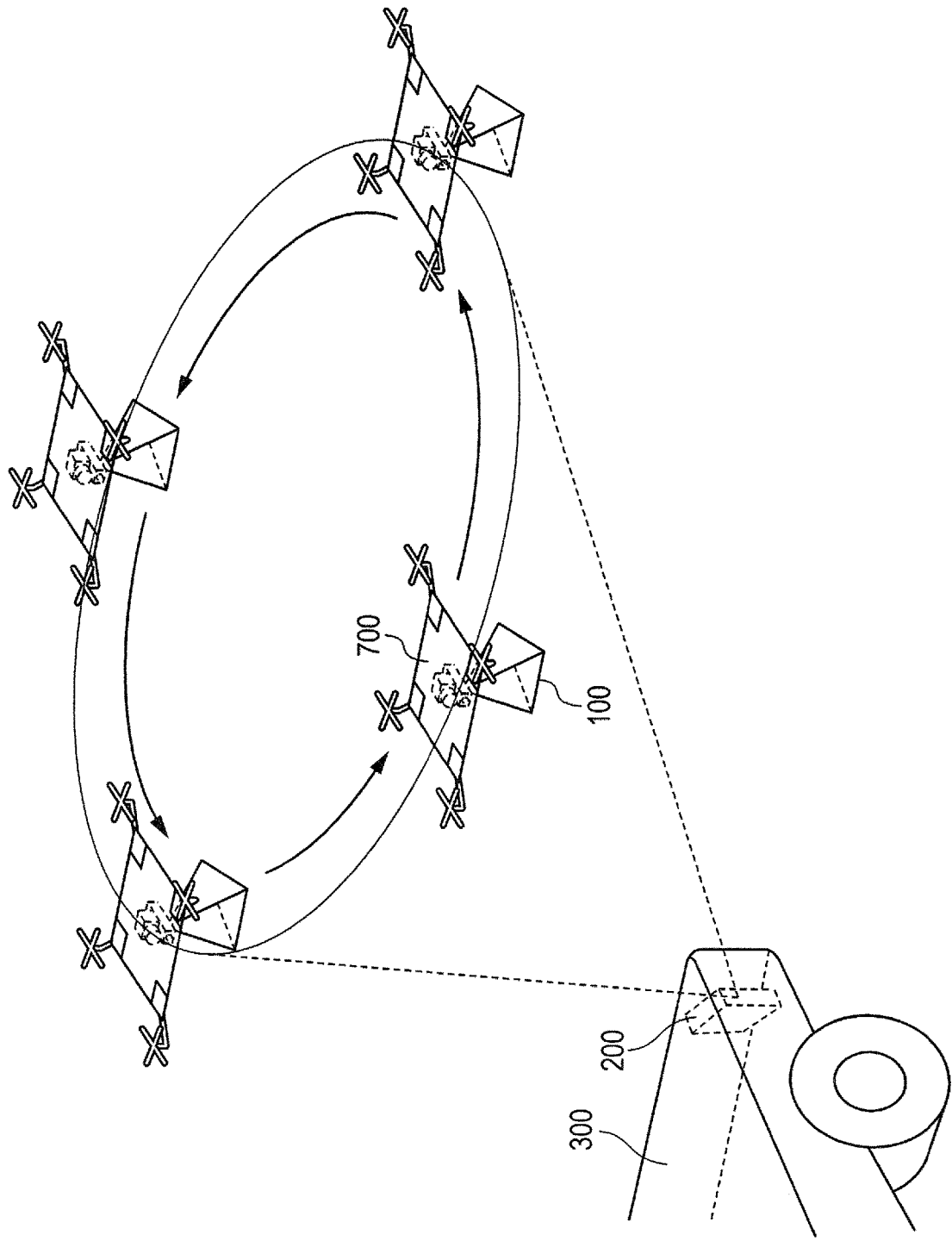
FIG. 16 illustrates a sixth application example of the radar axis displacement amount calculation device.

FIG. 16 illustrates a sixth application example of the radar axis displacement amount calculation device 100. As illustrated in FIG. 16, in the sixth application example, the small unmanned aerial device 700 described in the fourth application example can move freely in a three-dimensional manner with respect to an installed-and-fixed radar 200. In particular, in FIG. 16, the small unmanned aerial device 700 moves in an area close to an edge of a detectable range of the radar 200. Thus, the radar axis displacement amount calculation device 100 mounted on the small unmanned aerial device 700 can calculate the displacement amount, and further the radar 200 can measure reflection intensity from the reflector 101 in an area at an edge of the detectable range thereof.

FIG. 16 illustrates one small unmanned aerial device 700 performing a circular flight. However, the present disclosure is not limited thereto. For example, multiple small unmanned aerial devices 700 may sequentially perform a circular flight in an area in the vicinity of an edge of the detectable range of the radar 200.

SEVENTH APPLICATION EXAMPLE

Figure 17:
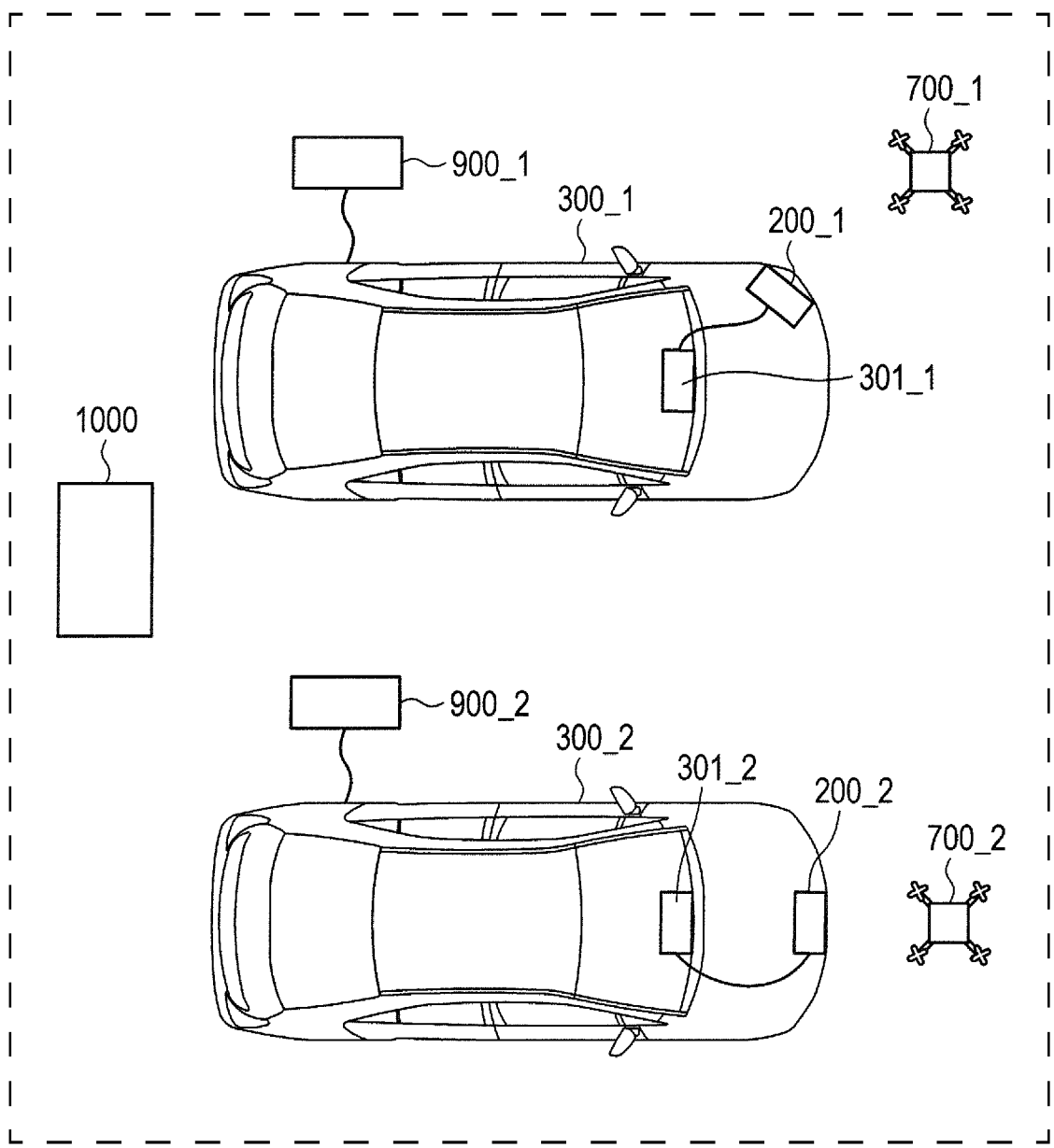
FIG. 17 illustrates a seventh application example of the radar axis displacement amount calculation device.

FIG. 17 illustrates a seventh application example of the radar axis displacement amount calculation device 100. As illustrated in FIG. 17, in the seventh application example, the axis displacement amount of the radar 200 is calculated by using the small unmanned aerial device 700 described in the fourth application example at a fuel supply facility such as a gas station while the vehicle 300 is parked for fuel supply and so on.

FIG. 17 is a plan view of a state where the vehicles 300_1 and 300_2 are parked in a fuel supply facility such as a gas station. In FIG. 17, a state is assumed where fuel supply devices 900_1 and 900_2 are supplying fuel to the vehicles 300_1 and 300_2 respectively.

In the seventh application example, while fuel supply devices the 900_1 and 900_2 are supplying fuel to vehicles the 300_1 and 300_2, the small unmanned aerial devices 700_1 and 700_2 stay stationary at locations apart by a predetermined distance from radars 200_1 and 200_2, and radar axis displacement amount calculation devices 100_1 and 100_2 calculate the radar axis displacement amount. Calculation of the axis displacement amount by radar axis displacement amount calculation devices 100_1 and 100_2 and flight control of the small unmanned aerial device 700 are performed in the same manner as the above application examples.

As illustrated in FIG. 17, the vehicle 300_1 includes car navigation device 301_1, and the vehicle 300_2 includes a car navigation device 301_2. In this application example, the car navigation devices 301_1 and 301_2 serve as a processor 104 of the radar axis displacement amount calculation device 100.

When intending to perform the axis displacement amount calculation processing of the radars 200_1 and 200_2 while supplying fuel, the operator inputs an axis displacement amount calculation start instruction to the car navigation devices 301_1 and 301_2 or the fuel supply devices 900_1 and 900_2. Then, the car navigation devices 301_1 and 301_2 or the fuel supply devices 900_1 and 900_2 request a server device 1000 to start the axis displacement amount calculation processing. The server device 1000 performs, for example, flight control of the small unmanned aerial devices 700_1 and 700_2. The server device 1000 is connected to the car navigation devices 301_1 and 301_2, the small unmanned aerial devices 700_1 and 700_2, and the fuel supply devices 900_1 and 900_2 in such a manner allowing wireless or wired communication with each other.

When receiving the request for starting the axis displacement amount calculation processing, the server device 1000 instructs the small unmanned aerial devices 700_1 and 700_2 to move to locations apart by a predetermined distance from the radars 200_1 and 200_2. The radar axis displacement amount calculation devices 100_1 and 100_2 mounted on the small unmanned aerial devices 700_1 and 700_2 that have moved to the instructed locations generate images by the camera 103 and transmit the images to the car navigation devices 301_1 and 301_2. The Car navigation devices 301_1 and 301_2 perform the same processing as the processor 104 in the embodiments and application examples described above and calculate the radar axis displacement amount. In the case where the radar axis is displaced from the reference direction, a message stating that adjustment of the radar axis is recommended is displayed, for example, on a display unit (not illustrated) of car navigation devices 301_1 and 301_2.

In the seventh application example, it is conceived that attachment position and attachment direction of the radar 200 change for each vehicle 300 unlike the first to sixth application examples. Therefore, the seventh application example is required to be adaptive to various vehicle models and various types of the radar. For this reason, the server device 1000 may perform image analysis, for example, based on images of the vehicles 300_1 and 300_2 generated by the camera 103 and identify the vehicle model and so on. Further, the server device 1000 may be connected to a network such as the Internet to identify the vehicle model and vehicle number by image analysis and thereby acquire information on the attachment position and detection range of the radars 200_1 and 200_2 of the vehicle concerned via the network. The entity providing such information is supposed to be, for example, a vehicle dealer.

In the case where it is better for a vehicle dealer identified based on the identification result of the vehicles 300_1 and 300_2 to adjust the radar axis, the server device 1000 notifies the vehicle dealer of that effect and transmits information such as the calculated displacement amount as well.

Further, the server device 1000 may acquire a required fuel supply quantity at the start of fuel supply, calculate the supply time and perform the radar axis displacement amount calculation processing based on the supply time. Thus, the supply time or the waiting time can be utilized. For example, in the case where the supply time is longer than a predetermined period of time, the server device 1000 performs not only the radar axis displacement amount calculation processing but also reflection intensity at edges of the detection range of radars 200_1 and 200_2.

Thus, in the seventh application example, information including the mount position of the radar 200 of various models is acquired via a network, and thereby the small unmanned aerial device 700 can be moved to an appropriate location to calculate the radar axis displacement amount. Although the seventh application example is described by using an example of application at a facility having a fuel supply device 900 such as a gas station, the application example is not limited thereto, and may include public parking areas such as a charging station for the electric car, a repair shop of the vehicle dealer, and a shopping center.

The server device 1000 may directly communicate with the car navigation device 301, for example, via dedicated short range communications (DSRC). Further, the function of the server device 1000 may be served by the car navigation device 301 as a substitute.

EIGHTH APPLICATION EXAMPLE

Figure 18:
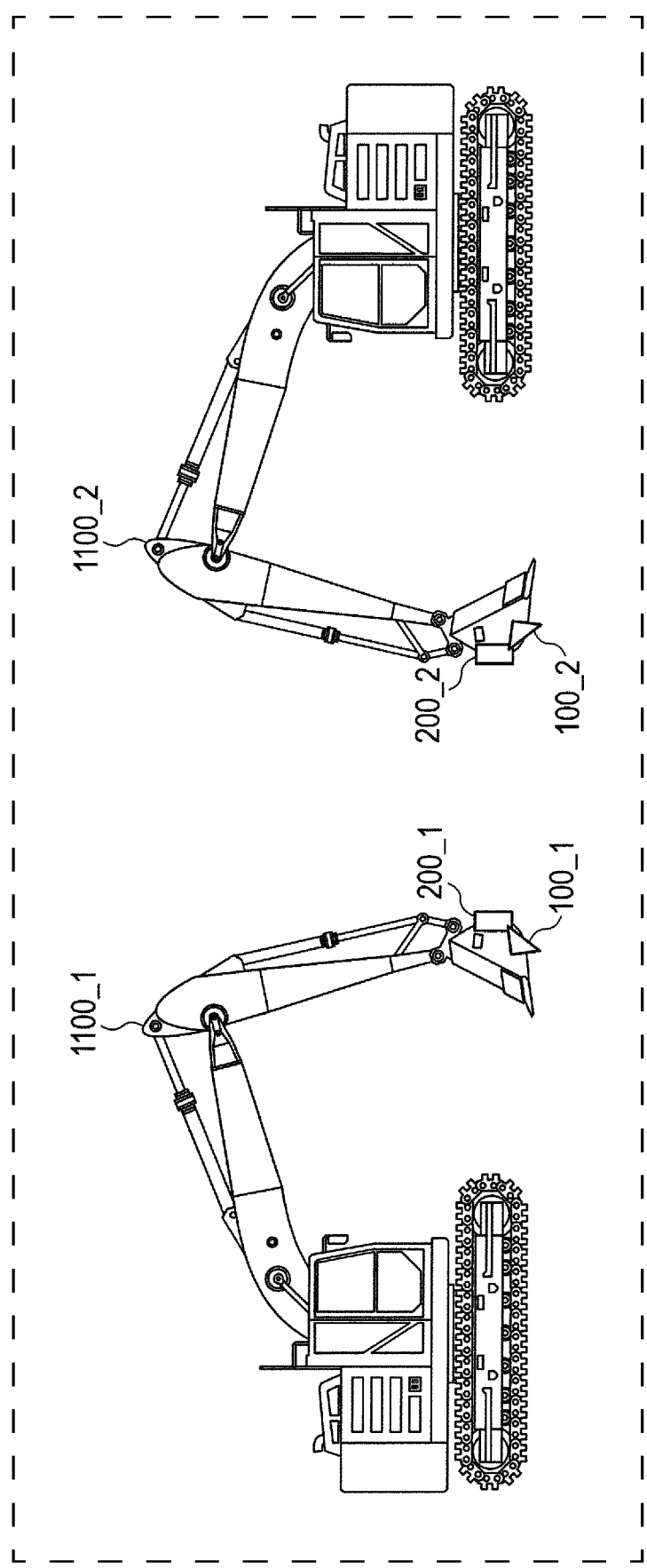
FIG. 18 illustrates an eighth application example of the radar axis displacement amount calculation device.

FIG. 18 illustrates an eighth application example of the radar axis displacement amount calculation device 100. The eighth application example assumes application of the radar axis displacement amount calculation device 100 to a construction machine such as hydraulic shovels 1100_1 and 1100_2.

As illustrated in FIG. 18, a radar 200_1 and a radar axis displacement amount calculation device 100_1 are attached to a hydraulic shovel 1100_1 (object 1), and a radar (object 2) 200_2 and a radar axis displacement amount calculation device 100_2 are attached to a hydraulic shovel 1100_2.

When the axis displacement amount calculation processing is performed for the radar 200_1 attached to the hydraulic shovel 1100_1, the hydraulic shovel 1100_1 stops and the radar 200_1 operates. In this state, the hydraulic shovel 1100_2 moves around the hydraulic shovel 1100_1 and moves the arm unit to which the radar axis displacement amount calculation device 100_2 is attached. Thus, the radar axis displacement amount calculation device 100_2 generates first position information indicating a relative position between the radar axis displacement amount calculation device 100_2 and the radar 200_1 with the radar axis displacement amount calculation device 100_2 as a reference, and acquires second position information indicating a relative position between the radar 200_1 and the radar axis displacement amount calculation device 100_2 with the radar 200_1 as a reference. The radar axis displacement amount calculation device 100_2 performs the same operation as in the above embodiments and application examples based on those sets of information, and thereby can calculate a displacement amount of the radar 200_1 and determine whether the radar 200_1 is adjusted properly.

In the axis displacement amount calculation processing of the radar axis displacement amount calculation device 100 of the eighth application example, not only the horizontal positional relation but also the vertical positional information are critical factors. For this reason, the processor 104 of the radar axis displacement amount calculation device 100 calculates, for example, the position of the radar axis displacement amount calculation device 100 on the three-dimensional coordinate system with the radar 200 as a center.

NINTH APPLICATION EXAMPLE

Figure 19:
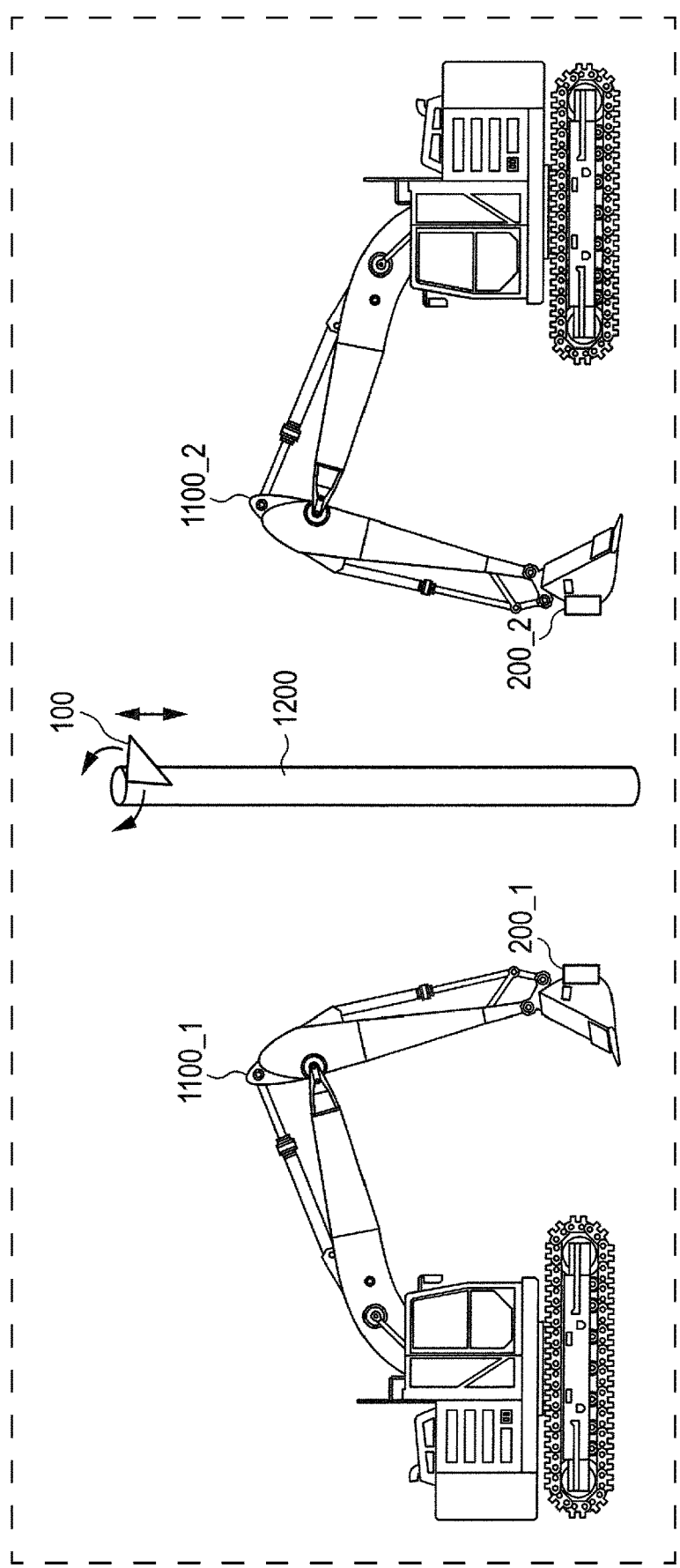
FIG. 19 illustrates a ninth application example of the radar axis displacement amount calculation device.

FIG. 19 illustrates a ninth application example of the radar axis displacement amount calculation device 100. In FIG. 19, a pole 1200 is placed close to the hydraulic shovels 1100_1 and 1100_2, and the radar axis displacement amount calculation device 100 is placed on the pole 1200. Thus, the axis displacement amount calculation processing of the radars 200 can be performed collectively.

The pole 1200 includes a mechanism capable of moving a radar axis displacement amount calculation device 100 attached to a tip end portion thereof, for example, in the horizontal direction and the vertical direction. The radar axis displacement amount calculation device 100 attached to the tip end portion of the pole 1200 adjusts the radars 200_1 and 200_2 attached to the hydraulic shovels 1100_1 and 1100_2 in a suitable manner.

In the ninth application example, when the hydraulic shovels 1100_1 and 1100_2 are not used, for example, such as in the night time, the hydraulic shovels 1100_1 and 1100_2 may be stopped in the vicinity of the pole 1200, and the radars 200_1 and 200_2 may be put in the operation state. The radar axis displacement amount calculation device 100 automatically detects the position of the radars 200_1 and 200_2, automatically changes the direction thereof to a direction corresponding to the detected position, and automatically performs the displacement amount calculation processing of the radar axis.

FIG. 19 illustrates the two hydraulic shovels 1100_1 and 1100_2 located close to the pole 1200. However, more (three or more) hydraulic shovels may be located close to the pole 1200 such that the radar axis displacement amount calculation device 100 calculates the displacement amount of the radar of each of the hydraulic shovels.

TENTH APPLICATION EXAMPLE

Figure 20:
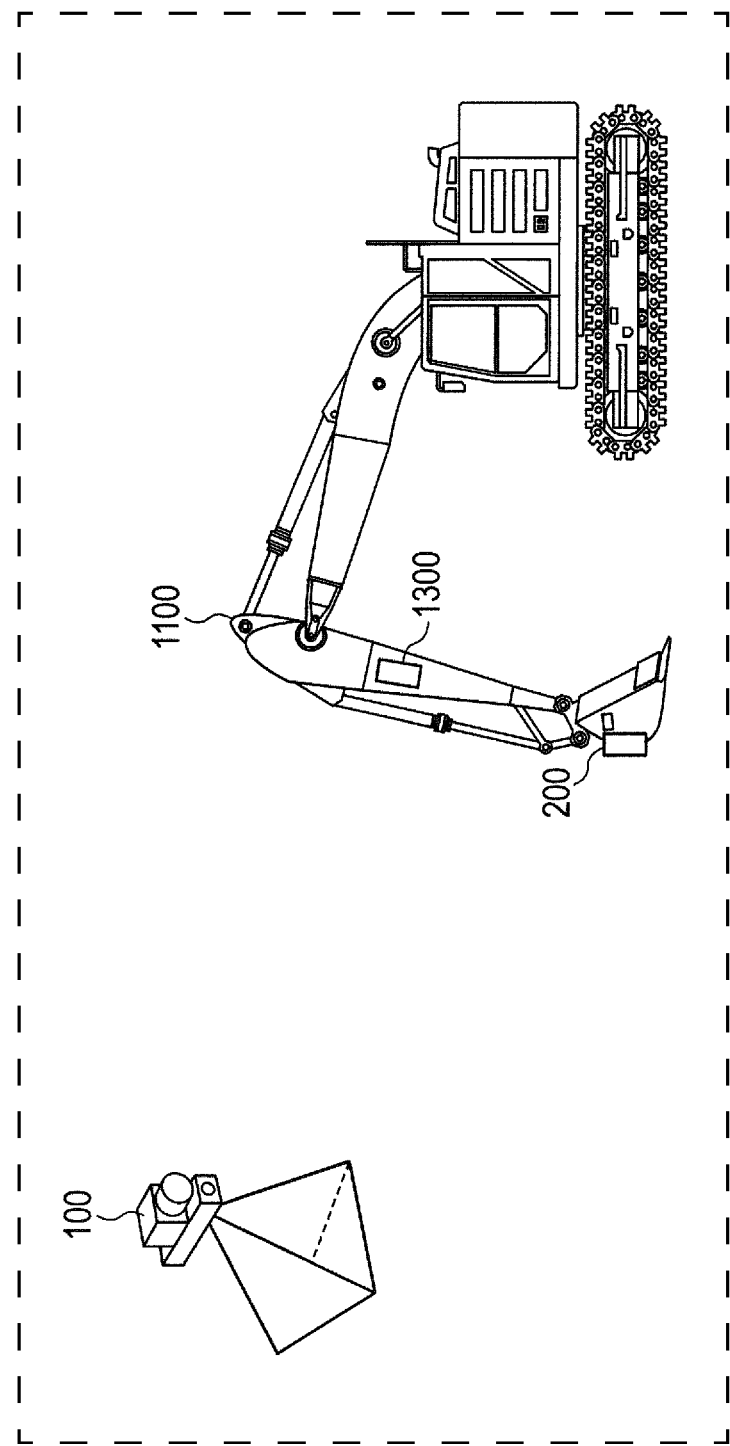
FIG. 20 illustrates a tenth application example of the radar axis displacement amount calculation device.

FIG. 20 illustrates a tenth application example of the radar axis displacement amount calculation device 100. FIG. 20 illustrates an example of the axis displacement amount calculation processing of a radar 200 attached to the arm in consideration of effects of the arm deflection caused when the hydraulic shovel 1100 lifts a heavy load with the arm.

In FIG. 20, the hydraulic shovel 1100 includes a radar 200 and a deflection sensor 1300. The radar 200 and the deflection sensor 1300 are attached to a portion of the hydraulic shovel 1100 such as an arm unit. The deflection sensor 1300 is configured to measure deflection of the arm unit when a portion of the hydraulic shovel 1100 such as the arm unit lifts a heavy load. When the arm unit is deflected, position of the radar 200 varies. Even in an image generated by the camera 103, position of the radar varies when there is a deflection, as compared when there is no deflection.

Therefore, in the tenth application example, assuming that the arm unit is deflected by a heavy load, the radar axis displacement amount calculation device 100 acquires information on the deflection amount from the deflection sensor 1300 when performing the displacement amount calculation processing. When performing image analysis, the radar axis displacement amount calculation device 100 corrects reference data based on the acquired deflection amount. Specifically, the radar axis displacement amount calculation device 100 prestores information on the deformation amount in an image of the arm unit corresponding to the deflection amount, and corrects reference data based on the information. The radar axis displacement amount calculation device 100 is capable of detecting the position of the radar 200 with high accuracy. The radar axis displacement amount calculation device 100 is also capable of calculating the displacement amount in consideration of a displacement caused by deflection.

The above embodiments, modified examples and application examples are described with reference to examples in which the radar 200 is mounted on the vehicle 300 or the hydraulic shovel 1100 as an example of the construction machine. However, the present disclosure is not limited thereto, and can be applied to a radar mounted on an object other than the vehicle and construction machine.

The application examples of the present disclosure described above can be applied not only to the radar axis displacement amount calculation device 100 according to the above embodiments but also to any one of the first to fourth modified examples.

A radar axis displacement amount calculation device according to a first aspect of the present disclosure includes:

a reflector that reflects a radar transmission wave in an arrival direction of the radar transmission wave, the radar transmission wave being transmitted by a radar attached to a first object;

a camera that generates a first image including a portion of the first object to which the radar is attached; and a processor that calculates a displacement amount between a radar axis being a direction of the radar transmission wave transmitted by the radar, and a reference direction being a direction serving as a reference of the radar transmission wave transmitted by the radar by using the first image and the arrival direction of the radar transmission wave, wherein the camera has an optical axis aligned with a facing direction of the reflector, and the processor generates first position information on a relative position between the camera and the radar by using the first image; acquires, from the radar, second position information on a relative position between the radar and the reflector, the second position information being generated by using the arrival direction of the radar transmission wave; and calculates the displacement amount by comparing the first position information and the second position information with each other.

A radar axis displacement amount calculation device according to a second aspect of the present disclosure is different from the radar axis displacement amount calculation device according to the first aspect in that the processor calculates a difference between the first position information and the second position information as the displacement amount.

A radar axis displacement amount calculation device according to a third aspect of the present disclosure is different from the radar axis displacement amount calculation device according to the first aspect in that the camera outputs one or more second images of the first object captured in advance from one or more capturing positions as one or more reference images, and the processor performs arithmetic operation of a correlation between the first image and the one or more reference images based on a table in which the one or more reference images and the one or more capturing positions are associated with each other, and generates the first position information based on the capturing position associated with a reference image having highest correlation.

A radar axis displacement amount calculation device according to a fourth aspect of the present disclosure is different from the radar axis displacement amount calculation device according to the third aspect in that the radar axis displacement amount calculation device further includes a distance measuring unit that generates distance information by measuring a distance from the reflector to the radar.

When a first capturing distance of the first image and a second capturing distance of the second image are different from each other, the processor converts a scale of the second image based on the first capturing distance or converts a scale of the first image based on the second capturing distance.

A radar axis displacement amount calculation device according to a fifth aspect of the present disclosure is different from the radar axis displacement amount calculation device according to the first aspect in that the reflector is a target simulator that delays the radar transmission wave or performs frequency conversion of the radar transmission wave.

A radar axis displacement amount calculation device according to a sixth aspect of the present disclosure is different from the radar axis displacement amount calculation device according to the first aspect in that the first image includes a pattern of the first object, and the processor generates the first position information based on at least one of a position, a size and a direction of the pattern in the first image.

The radar axis displacement amount calculation device according to a seventh aspect of the present disclosure is different from the radar axis displacement amount calculation device according to the first aspect in that when the first object is moving at a constant speed, the radar measures Doppler frequency of the reflector, and after calculating the displacement amount, the processor further determines based on the Doppler frequency whether the radar axis adjusted based on the displacement amount is aligned with the reference direction.

A radar axis displacement amount calculation device according to an eighth aspect of the present disclosure is different from the radar axis displacement amount calculation device according to the first aspect in that the radar axis displacement amount device further includes comprising an unmanned aerial device.

The reflector and the camera are mounted on the unmanned aerial device.

A radar axis displacement amount calculation device according to a ninth aspect of the present disclosure is different from the radar axis displacement amount calculation device according to the eighth aspect in that the radar axis displacement amount calculation device further includes a flight controller that controls flight of the unmanned aerial device.

The flight controller controls the unmanned aerial device such that a relative positional relation between the unmanned aerial device and the radar is maintained.

A radar axis displacement amount calculation device according to a tenth aspect of the present disclosure is different from the radar axis displacement amount calculation device according to the eighth aspect in that the reflector is attached to a second object, and the camera is attached to the second object.

A radar axis displacement amount calculation device according to an eleventh aspect of the present disclosure includes:

a reflector that reflects a radar transmission wave in an arrival direction of the radar transmission wave, the radar transmission wave being transmitted by a radar attached to a first object;

a three-dimensional laser scanning device that generates three-dimensional position data including a portion of the first object to which the radar is attached; and a processor that calculates a displacement amount between a radar axis being a direction of the radar transmission wave transmitted by the radar, and a reference direction being a direction serving as a reference of the radar transmission wave transmitted by the radar by using the three-dimensional data and the arrival direction of the radar transmission wave.

The processor generates first position information on a relative position between the three-dimensional laser scanning device and the radar by using the three-dimensional position data, acquires, from the radar, second position information on a relative position between the radar and the reflector, the second position information being generated by using the arrival direction of the radar transmission wave, and calculates the displacement amount by comparing the first position information and the second position information with each other.

A radar axis displacement amount calculation method according to an twelfth aspect of the present disclosure includes:

reflecting a radar transmission wave in an arrival direction of the radar transmission wave by a reflective body, the radar transmission wave being transmitted by a radar attached to a first object;

generating a first image including a portion of the first object to which the radar is attached by using a camera;

generating first position information on a relative position between the camera and the radar by using the first image;

acquiring, from the radar, second position information on a relative position between the radar and the reflector, the second position information being generated by using the arrival direction of the radar transmission wave;

comparing the first position information and the second position information with each other; and calculating a displacement amount between a radar axis being a direction of the radar transmission wave transmitted by the radar, and a reference direction being a direction serving as a reference of the radar transmission wave transmitted by the radar.

Although embodiments are described as above with reference to the accompanying drawings, it is a matter of course that the present disclosure is not limited thereto. It is obvious that a person skilled in the art could easily conceive of various modified examples and corrected examples within a scope described in the claims, and it should be understood that such modified examples and corrected examples belong to the technical range of the present disclosure as well. Components in the embodiments described above may be combined as desired within a scope not deviating from the spirit of the present disclosure. In the above embodiments, the present disclosure is described by using examples formed by using hardware. However, the present disclosure may be implemented with software in coordination with hardware. Function blocks used for description of the above embodiments are typically implemented as LSI which is an integrated circuit having input terminals and output terminals. Each of these blocks may be put into one chip separately, or a portion or a whole of these blocks may be integrated into one chip. The term LSI used herein may be referred to as an IC, a system LSI, a super LSI, or an ultra LSI depending on the integration degree. The method for forming the integrated circuit is not limited to LSI, and may be implemented by using a dedicated circuit or a general purpose processor. The field programmable gate array (FPGA) which is programmable after fabrication of LSI, or a reconfigurable processor allowing reconfiguration of connection and setting of circuit cells inside the LSI may be used. Further, if a technology of forming the integration circuit in place of the LSI emerges by progress of the semiconductor technology or another derivative technology, a function block may be integrated by using the technique, of course. Application of the biotechnology is one of the potentialities.

The present disclosure is suitable for a radar axis displacement amount calculation device which calculates the displacement amount with respect to the reference direction of the radar axis of a radar device attached to a vehicle or a construction machine.

What is claimed is:

1. A radar axis displacement amount calculation device comprising:
   a reflector that, in operation, reflects a radar transmission wave in an arrival direction of the radar transmission wave, the radar transmission wave being transmitted by a radar attached to a first object;
   a camera that, in operation, generates a first image including a portion of the first object to which the radar is attached, the camera having an optical axis aligned with a reflecting axis of the reflector; and
   a processor that, in operation, calculates a displacement amount between a radar axis and a reference direction, the radar axis being an actual direction of the radar transmission wave transmitted by the radar, the reference direction being a desired direction of the radar transmission wave transmitted by the radar, wherein
   the processor generates first position information on a relative position between the camera and the radar by using the first image; acquires, from the radar, second position information on a relative position between the radar and the reflector, the second position information being generated by using the arrival direction of the radar transmission wave; and calculates the displacement amount by comparing the first position information and the second position information with each other.

2. The radar axis displacement amount calculation device according to claim 1, wherein the processor calculates a difference between the first position information and the second position information as the displacement amount.

3. The radar axis displacement amount calculation device according to claim 1, wherein the reflector is a target simulator that delays the radar transmission wave or performs frequency conversion of the radar transmission wave.

4. The radar axis displacement amount calculation device according to claim 1, wherein
   when the first object is moving at a constant speed, the radar measures a Doppler frequency of the reflector, and
   after calculating the displacement amount and adjusting the radar axis based on the displacement amount, the processor further determines based on the Doppler frequency whether the radar axis is aligned with the reference direction.

5. The radar axis displacement amount calculation device according to claim 1, further comprising an unmanned aerial device, wherein the reflector and the camera are mounted on the unmanned aerial device.

6. The radar axis displacement amount calculation device according to claim 1, wherein
   the reflector is attached to a second object, and
   the camera is attached to the second object.

7. A method of calculating a radar axis displacement amount comprising:
   reflecting a radar transmission wave in an arrival direction of the radar transmission wave by a reflector, the radar transmission wave being transmitted by a radar attached to a first object;
   generating a first image including a portion of the first object to which the radar is attached by using a camera, the camera having an optical axis aligned with a reflecting axis of the reflector; and
   calculating a displacement amount between a radar axis and a reference direction by using a processor, the radar axis being an actual direction of the radar transmission wave transmitted by the radar, the reference direction being a desired direction of the radar transmission wave transmitted by the radar, wherein the calculating includes:

generating first position information on a relative position between the camera and the radar by using the first image;

acquiring, from the radar, second position information on a relative position between the radar and the reflector, the second position information being generated by using the arrival direction of the radar transmission wave; and calculating the displacement amount by comparing the first position information and the second position information with each other.

* * * * *